(12) United States Patent
Kitayama et al.

(10) Patent No.: US 10,735,657 B2
(45) Date of Patent: Aug. 4, 2020

(54) IMAGE STABILIZATION APPARATUS, LENS APPARATUS, AND CAMERA SYSTEM

(71) Applicant: CANON KABUSHIKI KAISHA, Tokyo (JP)

(72) Inventors: Toma Kitayama, Utsunomiya (JP); Kazuhiro Noguchi, Utsonomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/396,107

(22) Filed: Apr. 26, 2019

(65) Prior Publication Data

US 2019/0335105 A1 Oct. 31, 2019

(30) Foreign Application Priority Data

Apr. 26, 2018 (JP) .................................. 2018-084728

(51) Int. Cl.
*H04N 5/232* (2006.01)
*G02B 7/02* (2006.01)
*H04N 5/225* (2006.01)

(52) U.S. Cl.
CPC ......... *H04N 5/23287* (2013.01); *G02B 7/023* (2013.01); *H04N 5/2254* (2013.01)

(58) Field of Classification Search
CPC ...... G02B 27/646; G02B 7/023; G02B 7/026; G03B 5/00; G03B 2205/0007; G03B 5/02; H04N 5/23287; H04N 5/23248; H04N 5/2254

See application file for complete search history.

(56) References Cited

U.S. PATENT DOCUMENTS

| 5,117,246 A | * | 5/1992 | Takahashi | ............... G02B 7/102 348/208.99 |
| 5,181,056 A | * | 1/1993 | Noguchi | ................ G02B 15/04 359/554 |
| 5,398,132 A | * | 3/1995 | Otani | ................... G02B 27/646 348/E5.046 |

(Continued)

FOREIGN PATENT DOCUMENTS

| JP | H07199258 A | 8/1995 |
| JP | H1090587 A | 4/1998 |

(Continued)

OTHER PUBLICATIONS

Extended European Search Report issued by the European Patent Office in corresponding European Patent Application No. 19170667.0 dated Aug. 22, 2019.

*Primary Examiner* — Chiawei Chen
(74) *Attorney, Agent, or Firm* — Carter, DeLuca & Farrell LLP

(57) ABSTRACT

An image stabilization apparatus includes a fixed member, a movable member configured to hold an image stabilization lens and movable relative to the fixed member on a plane perpendicular to an optical axis of the image stabilization lens, a lock member that is disposed on an outer circumference side of the movable member and can be positioned at a lock position for restricting a movement of the movable member and an unlock position for enabling the movement of the movable member, and a retaining member configured to fix the movable member in an eccentric state when the lock member is located at the lock position.

18 Claims, 24 Drawing Sheets

(56) References Cited

U.S. PATENT DOCUMENTS

| | | | | |
|---|---|---|---|---|
| 5,774,266 A * | 6/1998 | Otani | G02B 27/64 |
| | | | 359/554 |
| 5,897,226 A * | 4/1999 | Okada | G03B 5/00 |
| | | | 359/554 |
| 5,943,169 A * | 8/1999 | Okada | G02B 27/646 |
| | | | 348/E5.046 |
| 6,208,810 B1 * | 3/2001 | Imada | G02B 27/646 |
| | | | 396/55 |
| 2004/0051981 A1 * | 3/2004 | Nomura | G02B 7/022 |
| | | | 359/822 |
| 2004/0085639 A1 * | 5/2004 | Katagishi | G02B 7/022 |
| | | | 359/557 |
| 2005/0264899 A1 * | 12/2005 | Manabe | G02B 7/102 |
| | | | 359/811 |
| 2006/0274435 A1 * | 12/2006 | Nomura | G02B 7/022 |
| | | | 359/819 |
| 2008/0291540 A1 * | 11/2008 | Nakamura | G02B 27/648 |
| | | | 359/554 |
| 2011/0134528 A1 * | 6/2011 | Suzuka | G02B 27/646 |
| | | | 359/554 |
| 2011/0181969 A1 * | 7/2011 | Terao | G02B 7/021 |
| | | | 359/819 |
| 2016/0216594 A1 | 7/2016 | Masahiro | |
| 2019/0271825 A1 * | 9/2019 | Kawanabe | G02B 7/023 |
| 2019/0317381 A1 | 10/2019 | Kitayama | |
| 2020/0011474 A1 * | 1/2020 | Shan | G03B 17/563 |

FOREIGN PATENT DOCUMENTS

| | | |
|---|---|---|
| JP | 4050082 B2 | 2/2008 |
| JP | 5495860 B2 | 5/2014 |

\* cited by examiner

ECCENTRICITY DIRECTION

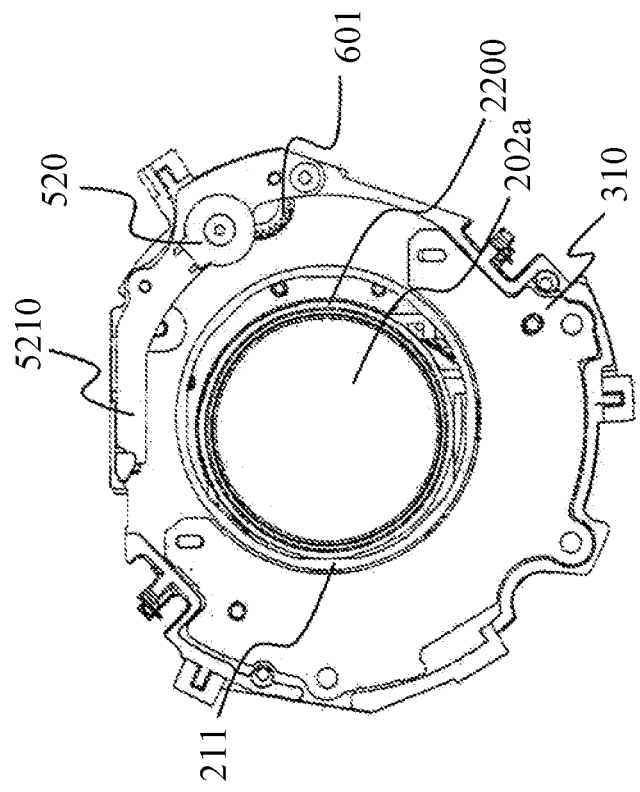
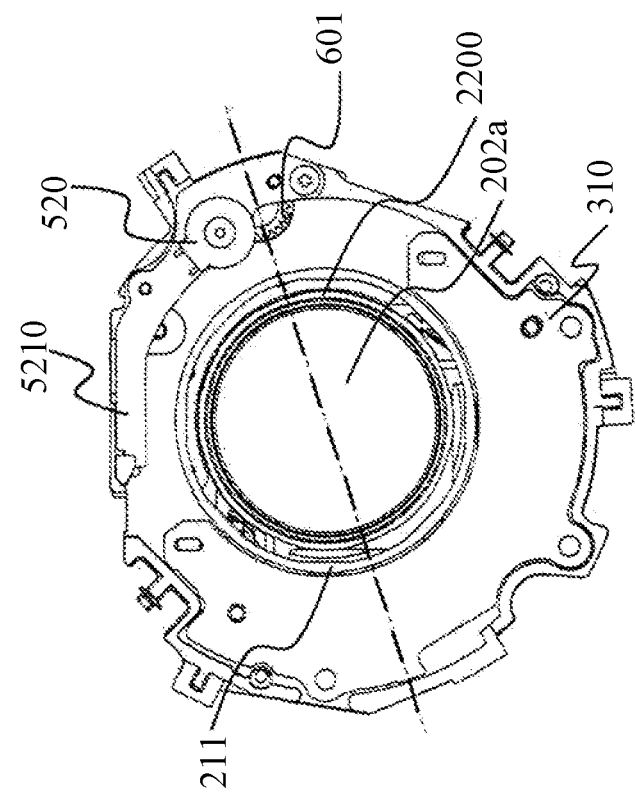
FIG. 20A
FIG. 20B

IMAGE STABILIZATION APPARATUS, LENS APPARATUS, AND CAMERA SYSTEM

BACKGROUND OF THE INVENTION

Field of the Invention

The present invention relates to an image stabilization apparatus, a lens apparatus, and a camera system.

Description of the Related Art

An image stabilization apparatus has been conventionally known which suppresses an image blur by translating part of a lens unit on a plane perpendicular to an optical axis in an imaging apparatus. In addition, a retaining mechanism for the image stabilization apparatus has been proposed so as to restrict the movable lens unit from the translational movement for a non-image-stabilization period. When the retaining mechanism restricts the movement of the movable lens unit, any impacts applied from the outside to the movable lens unit can be reduced or the portability of a product including the image stabilization apparatus can be improved.

Japanese Patent No. ("JP") 5495860 discloses an optical image stabilization apparatus having a ring-shaped retaining mechanism rotatable around an optical axis. JP 4050082 discloses an optical axis lock mechanism that is provided at three or more locations around the optical axis of the movable lens frame and configured to restrict the movement of the movable lens frame by a spring-forced lever-shaped retaining member.

However, the optical image stabilization apparatus in JP 5495860 needs a projection shape for engaging a ring-shaped retaining member with a movable lens frame. Where the movable lens frame is not restricted from moving, it is necessary to avoid a contact between the projection shape of the movable lens frame and the lens frame on the fixed side. Therefore, the fixed lens frame side needs a corresponding relief shape and the apparatus is prevented from being smaller.

In the optical axis lock mechanism disclosed in JP 4050082, it is difficult to arrange at least three retaining members at regular intervals apart from a driving unit, such as a magnet and a yoke, for driving the movable lens frame, and the apparatus is prevented from being smaller.

SUMMARY OF THE INVENTION

The present invention provides an image stabilization apparatus, a lens apparatus, and a camera system, each of which can be made compact.

An image stabilization apparatus according to one aspect of the present invention includes a fixed member, a movable member configured to hold an image stabilization lens and movable relative to the fixed member on a plane perpendicular to an optical axis of the image stabilization lens, a lock member that is disposed on an outer circumference side of the movable member and can be positioned at a lock position for restricting a movement of the movable member and an unlock position for enabling the movement of the movable member, and a retaining member configured to fix the movable member in an eccentric state when the lock member is located at the lock position. The lens apparatus and the camera system including the above image stabilization apparatus also constitute one aspect of the present invention.

Further features of the present invention will become apparent from the following description of exemplary embodiments with reference to the attached drawings.

BRIEF DESCRIPTION OF THE DRAWINGS

FIGS. 20A and 20B illustrate the image stabilization unit in the unlock state and in the lock state.

DESCRIPTION OF THE EMBODIMENTS

Figure 1:
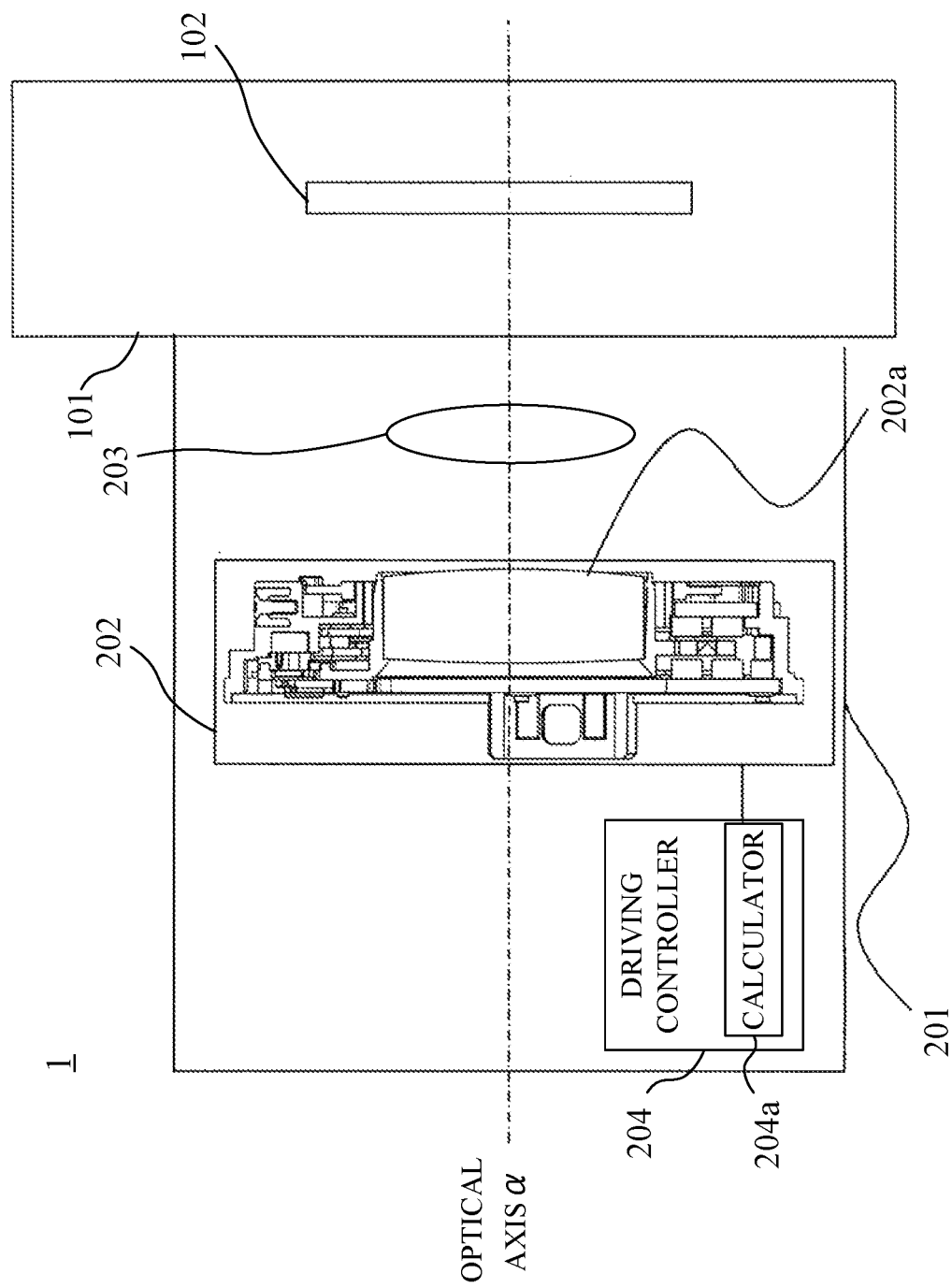
FIG. 1 illustrates a configuration of a camera system according to one embodiment of the present invention.

Referring now to the accompanying drawings, a detailed description will be given of embodiments according to the present invention. In each of the drawings, the same elements will be designated by the same reference numerals, and a duplicate description thereof will be omitted.

First Embodiment

FIG. 1 illustrates a configuration of a digital still camera as an illustrative camera system 1 according to one embodiment of the present invention. The camera system 1 includes an imaging apparatus 101 and a lens barrel (lens apparatus) 201. The lens barrel 201 may be integrated with the imaging apparatus 101, or detachably attached to the imaging apparatus 101.

The imaging apparatus 101 includes an image sensor 102 that photoelectrically converts an object image formed via the lens barrel 201. The image sensor 102 can mainly use a CCD image sensor, a CMOS image sensor, etc.

The lens barrel 201 includes an image stabilization unit (image stabilization apparatus) 202 including a correction lens 202a, a movable lens 203 movable along an optical axis α, and a driving controller 204 including a calculator 204a. The image stabilization unit 202 corrects an image blur by moving the correction lens 202a on a plane perpendicular to the optical axis α. In FIG. 1, the correction lens 202a is located at a center position (reference position) of the optical axis α. The movable lens 203 includes at least one of a zoom lens and a focus lens. The driving controller 204 controls driving of the correction lens 202a based on a driving amount of the correction lens 202a calculated by the calculator 204a. In addition to the correction lens 202a and the movable lens 203, the lens barrel 201 has an unillustrated lens unit that constitutes an imaging optical system.

Figure 2:
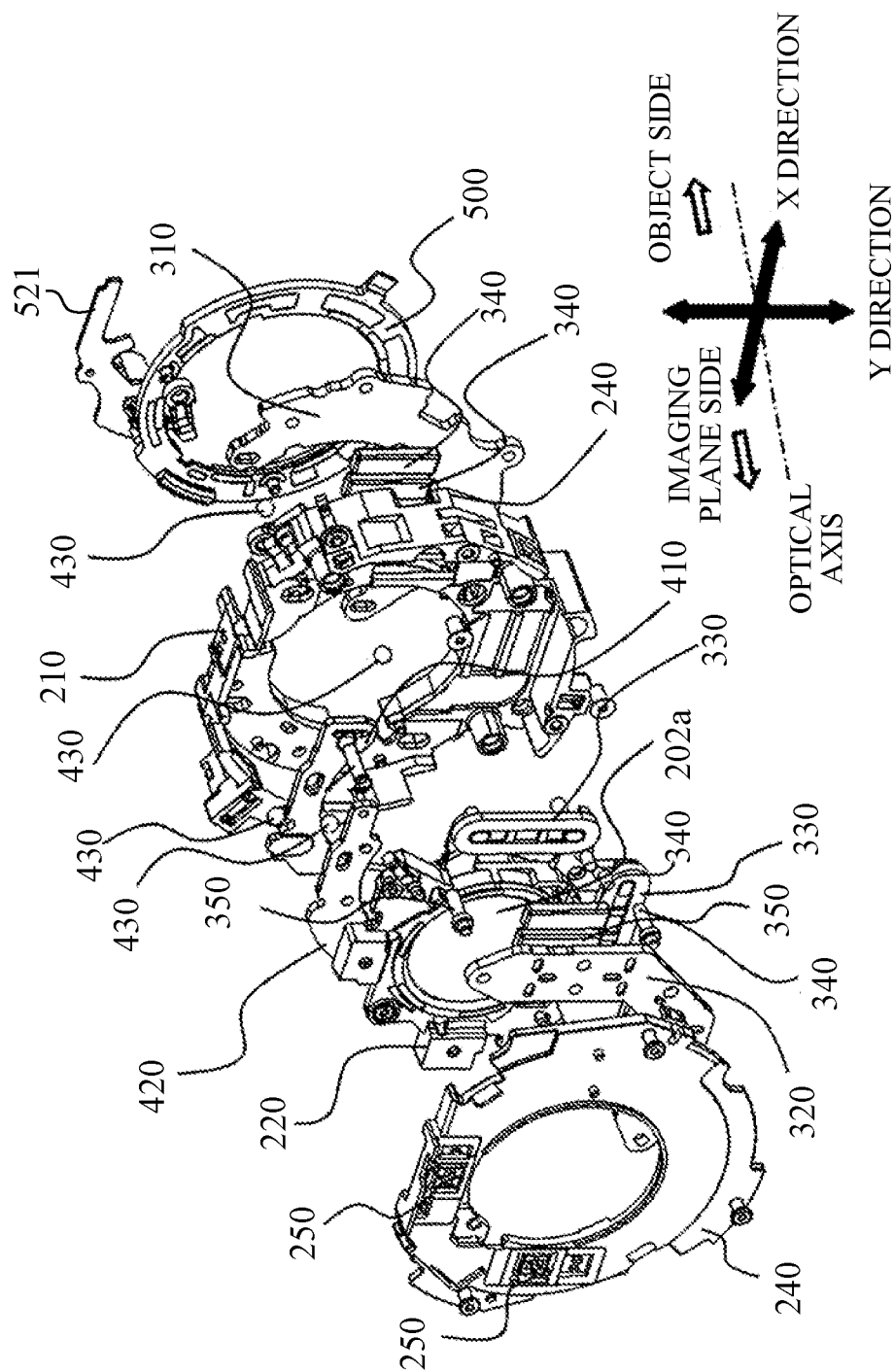
FIG. 2 is an exploded perspective view of an image stabilization unit viewed from an imaging plane side.
Figure 3:
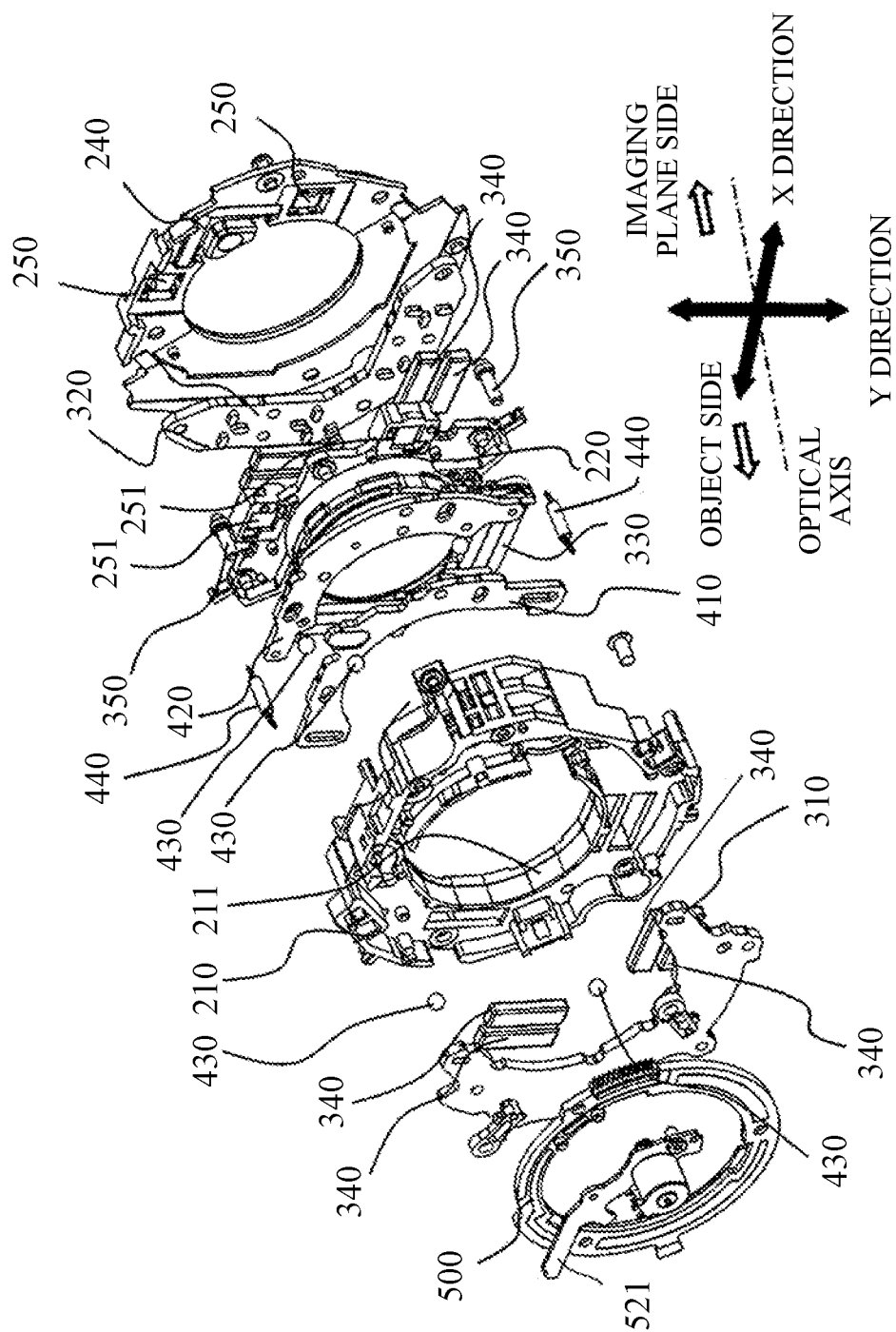
FIG. 3 is an exploded perspective view of the image stabilization unit viewed from an object side.

Referring now to FIGS. 2 and 3, a description will be given of a driving principle and configuration of the image stabilization unit 202. FIG. 2 is an exploded perspective view of the image stabilization unit 202 viewed from an imaging plane side of the image sensor 102. FIG. 3 is an exploded perspective view of the image stabilization unit 202 viewed from an object side.

A movable lens frame (movable member) 220 is a frame member that can retain the correction lens 202a. A fixed lens frame (fixed member) 210 is fixed onto the lens barrel 201 in a direction (optical axis perpendicular direction) perpendicular to the optical axis α. The driver includes a first yoke 310, a second yoke 320, a shift coil 330, and a shift magnet 340. The first yoke 310 and the second yoke 320 are fixed onto the fixed lens frame 210. The second yoke 320 is disposed on a side opposite to a side on which the first yoke 310 is disposed, with respect to the movable lens frame 220. Two shift coils 330 are fixed onto the movable lens frame 220. These two shift coils 330 are distant from the optical axis center by the same amount form an angle of 90° with respect to it. Shift magnets 340 is disposed on the first yoke 310. Two shift magnets 340 are disposed at each of two positions overlapping the shift coil 330 viewed in the optical axis direction. These two positions are distant from the optical axis center by the same amount. The shift magnet 340 is also disposed on the second yoke 320.

A closed magnetic circuit is formed by the first yoke 310, the second yoke 320, and the shift magnets 340, and the first yoke 310 and the second yoke 320 attract each other by the magnetic attraction force. A shaft 350 is disposed between the first yoke 310 and the second yoke 320, and prevents each yoke and the fixed lens frame 210 from being deformed by the magnetic attraction force. When the shift coils 330 are energized in the magnetic circuit, the movable lens frame 220 moves in the X and Y directions by the electromagnetic interaction of the coil and the magnet. Therefore, the movable lens frame 220 is movable in the X and Y directions on the plane perpendicular to the optical axis α relative to the fixed lens frame 210.

A position detecting portion 250 and a position detected portion 251 detect a relative movement amount of the movable lens frame 220 relative to the fixed lens frame 210. As a detection method, for example, the conventional method detects the relative position of a Hall element and a magnet using a Hall effect. In this embodiment, the position detecting portion 250 as a Hall sensor is provided on a sensor holding frame 240 integrated with the fixed lens frame 210, and the position detected portion 251 as the magnet is provided on the movable lens frame 220. The position detecting portion 250 and the position detected portion 251 are distant from the optical axis center by the same amount and form an angle of 90° with respect to it.

The first yoke 310, a first anti-roll plate 410, a second anti-roll plate 420, and six rolling balls 430 constitute a rotation suppressing mechanism that prevents the movable lens frame 220 from rotating around the optical axis α relative to the fixed lens frame 210. The second anti-roll plate 420 is fixed onto the movable lens frame 220.

Each of the first yoke 310 and the first anti-roll plate 410 has two guide grooves in the same direction perpendicular to the optical axis α. The two rolling balls 430 are held between the guide groove of the first yoke 310 and the guide groove of the first anti-roll plate 410. One rolling ball 430 is held between the fixed lens frame 210 and the first anti-roll plate 410 without being restricted by the groove. This configuration enables the first anti-roll plate 410 to move relative to the first yoke 310 only in a single predetermined direction perpendicular to the optical axis α.

Each of the first anti-roll plate 410 and the second anti-roll plate 420 has two guide grooves in the same direction perpendicular to the optical axis α. The two rolling balls 430 are held between the first anti-roll plate 410 and the second anti-roll plate 420. This configuration enables the second anti-roll plate 410 to move relative to the first anti-roll plate 410 only in a single predetermined direction perpendicular to the optical axis α. The direction in which the second anti-roll plate 420 moves relative to the first anti-roll plate 410 is different from the direction in which the first anti-roll plate 410 moves relative to the first yoke 310.

One rolling ball 430 is held between the movable lens frame 220 and the first yoke 310 without being restricted by the grooves. This configuration enables the movable lens frame 220 to move in the direction perpendicular to the optical axis without rotating relative to the fixed lens frame 210. The fixed lens frame 210 and the movable lens frame 220 are biased by a coil spring 440 so as to approach to each other. Suppressing the relative rotations of the fixed lens frame 210 and the movable lens frame 220 in this way can prevent the position detecting portion 250 and the position detected portion 251 from erroneously detecting the position.

Figure 4:
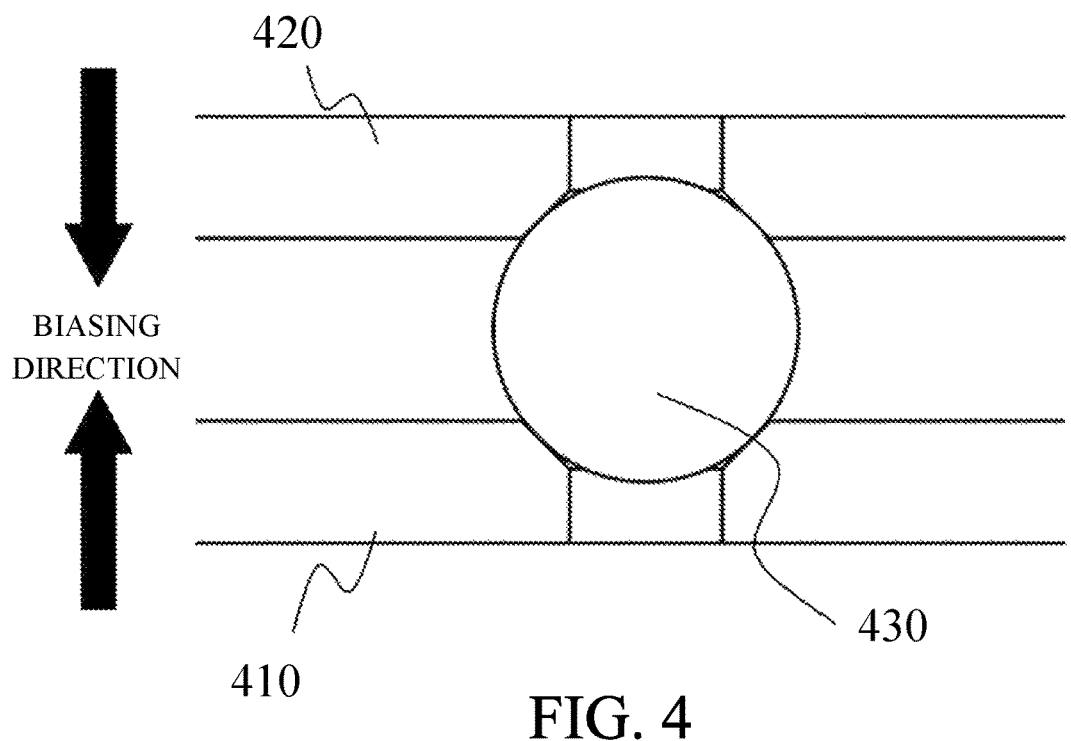
FIG. 4 illustrates a rolling ball contacting with a rolling ball contact portion.

Referring now to FIG. 4, a description will be given of the structures of the anti-roll plate and the rolling ball. FIG. 4 is a sectional view along a plane perpendicular to the longitudinal direction of the guide groove which passes the central position of the rolling ball 430 held between the first anti-roll plate 410 and the second anti-roll plate 420.

The first anti-roll plate 410 and the second anti-roll plate 420 contact the rolling ball 430 with a plane that forms an angle of 45° with the plane perpendicular to the optical axis α. When the coil spring 440 biases the first anti-roll plate 410 and the second anti-roll plate 420 so that they approach to each other, the rolling balls 430 can be restrained from floating. The other rolling ball held by the guide grooves can also steadily roll by the similar configuration. Hence, the movable lens frame 220 can move without rotating on the plane perpendicular to the optical axis α.

Figure 5:
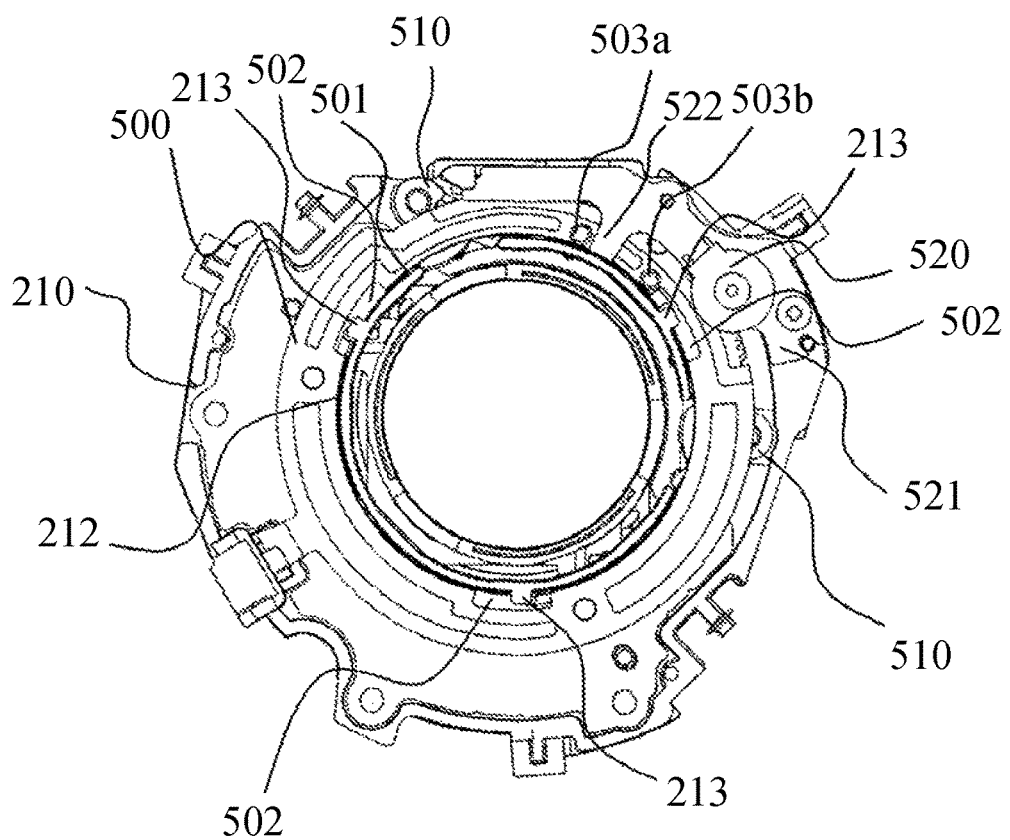
FIG. 5 illustrates a lock mechanism in an unlock state.
Figure 6:
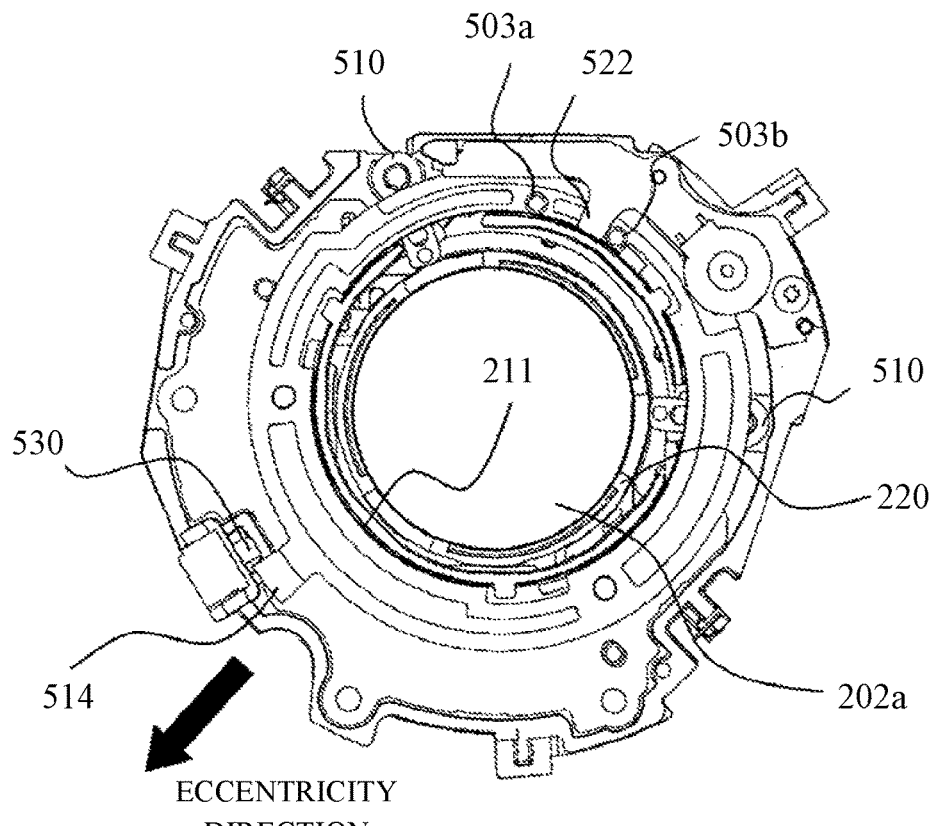
FIG. 6 illustrates the lock mechanism in a lock state.
Figure 7:
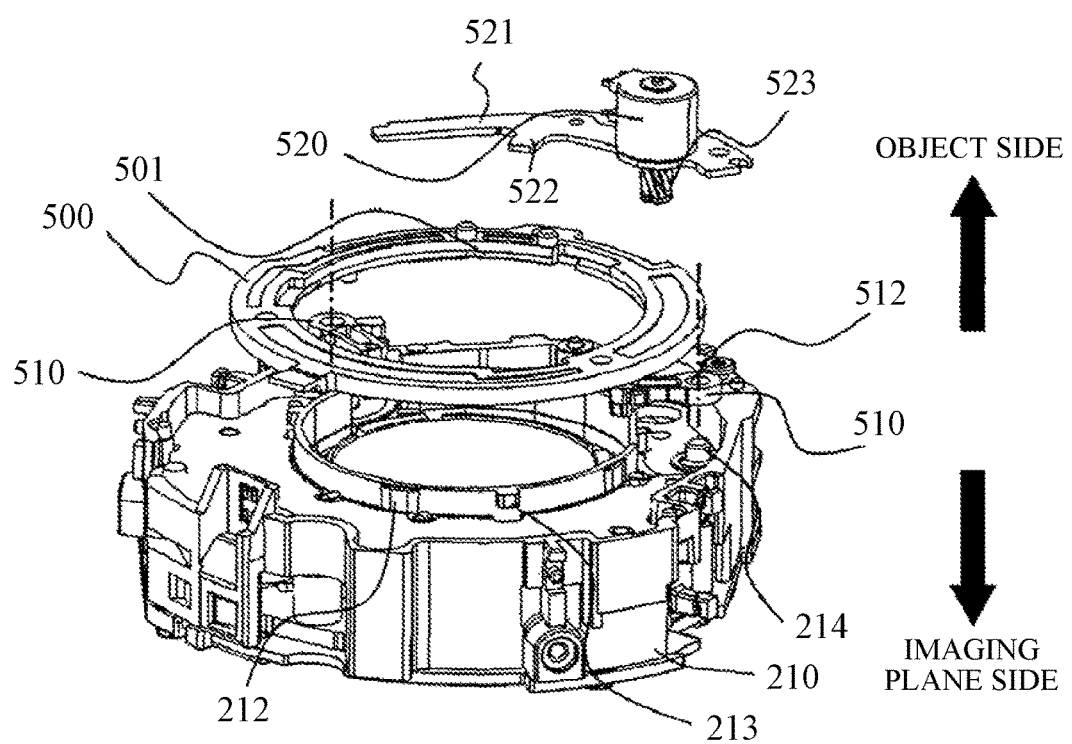
FIG. 7 is an exploded perspective view showing a structure of the lock mechanism.

Referring now to FIGS. 5 to 9, a description will be given of the lock mechanism for restricting the movement of the movable lens frame 220. FIG. 5 illustrates the lock mechanism in the unlock state in which the movable lens frame 220 is not restricted from moving in the direction perpendicular to the optical axis. FIG. 6 illustrates the lock mechanism in the lock state in which the movable lens frame 220 is restricted from moving in the direction perpendicular to the optical axis. FIG. 7 is an exploded perspective view of the structure of the lock mechanism.

The lock mechanism includes a lock ring (lock member) 500, two lock levers (retaining members, first retaining members) 510, and a lock motor (second driver) 520. The lock ring 500 has a radial engagement portion 501, and the fixed lens frame 210 has a radial engagement portion 212. The radial engagement between the radial engagement portions 501 and 212 retains the lock ring 500 between the unlock position and the lock position rotatably around the optical axis. The fixed lens frame 210 includes bayonet units 213 at three phases, and the lock ring 500 includes bayonet units 502 corresponding to the bayonet units 213 at three phases. The engagement between the bayonet units 213 and 502 prevents the lock ring 500 from disengaging from the fixed lens frame 210 except in the assembly phase. The lock ring 500 has lock ring side mechanical ends (restricting portions) 503a and 503b, and a motor sheet metal (second retaining member) 521 has a fixed side mechanical end (contact portion, second contact portion) 522. The contact between the lock ring side mechanical ends 503a and 503b and the fixed side mechanical end 522 restricts the rotation range of the lock ring 500 relative to the fixed lens frame 210. The lock ring 500 has a gear portion 505, and a motor pinion 523 engaged with the gear portion 505 is attached to the lock motor 520. Thus, as the lock motor 520 rotates, the lock ring 500 rotates.

As described above, the lock ring 500 is rotatably held around the optical axis by the diameter engagement with the fixed lens frame 210. The lock lever 510 is a lever member having a rotation axis on the outer circumference of the movable lens frame 220, and a plurality of lock levers 510 are arranged at different phases on the outer circumference of the movable lens frame 220. The lock lever 510 has an engagement hole 512, and the fixed lens frame 210 has an engagement shaft 214. An engagement between the engagement shaft 214 and the engagement hole 512 holds the lock lever 510 rotatably around the engagement shaft 214.

The fixed lens frame 210 also includes a rotation detecting portion 530. In this embodiment, the rotation detecting portion 530 is a photo-interrupter, and detects a state of the lock ring 500 when part (rotation detected portion 514 in this embodiment) of the shape of the lock ring 500 passes.

Figure 8:
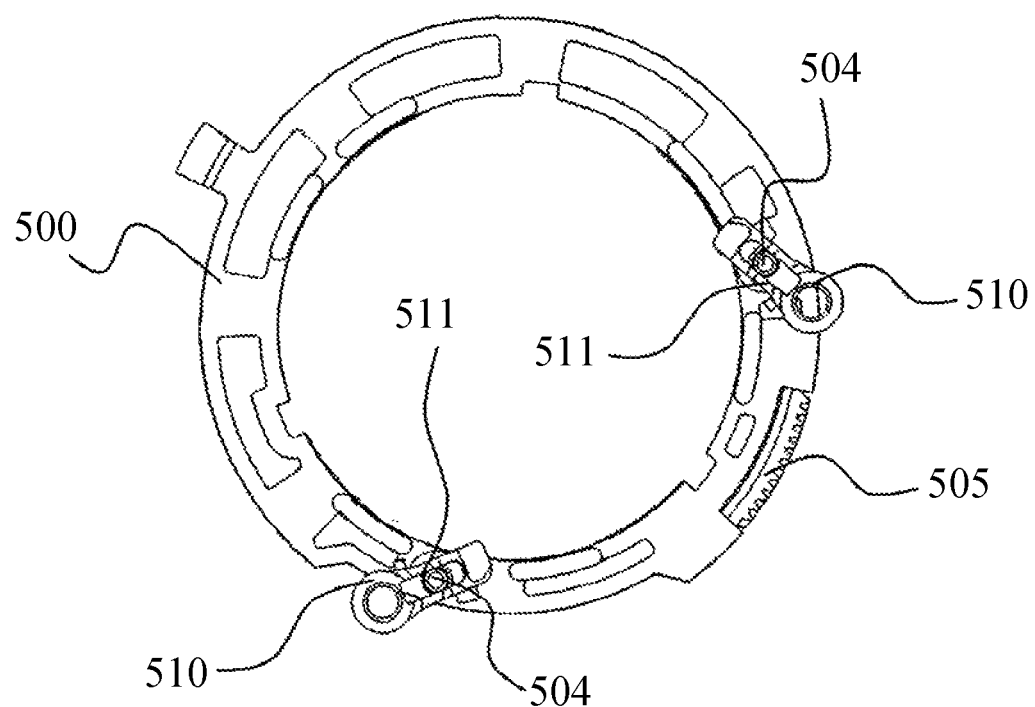
FIG. 8 illustrates a relationship between a lock ring and a lock lever in the unlock state.
Figure 9:
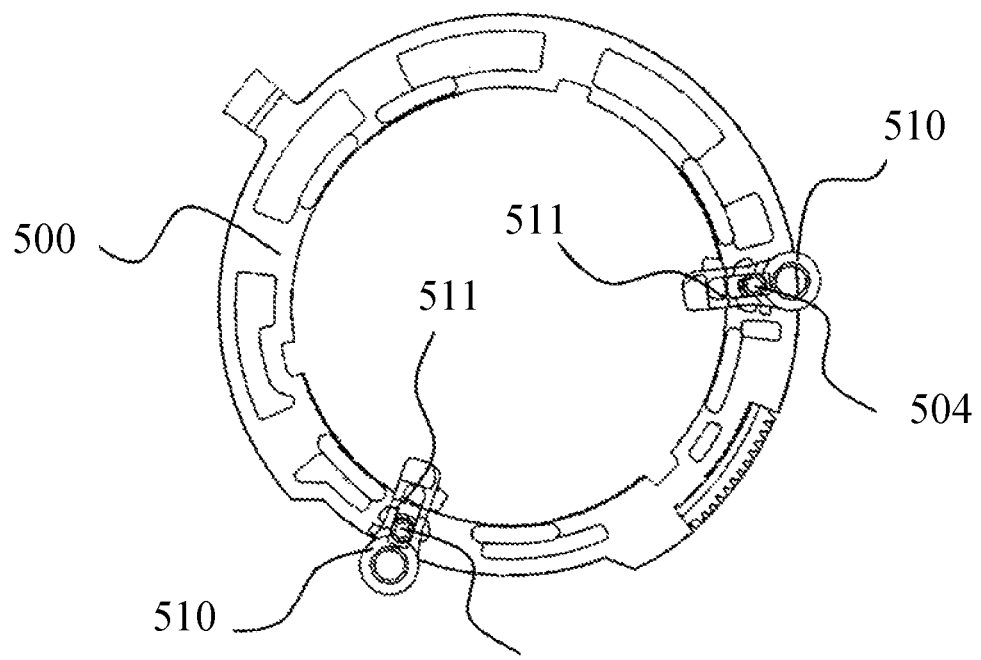
FIG. 9 illustrates a relationship between the lock ring and the lock lever in the lock state.

FIGS. 8 and 9 illustrate the lock ring 500 and the lock lever 510 viewed from the imaging plane side, or the relationship between the lock ring 500 and the lock lever 510. The lock lever 510 has an engaging portion 511. The lock ring 500 has an engaging portion 504 engaged with the engaging portion 511. Since the lock lever 510 rotates around the engagement shaft 214, as the lock ring 500 rotates, the lock lever 510 receives a force from the engaging portion 504 engaged with the engaging portion 511 and rotates.

When the lock ring 500 is located at the unlock position as illustrated in FIG. 5, the lock lever 510 does not contact the movable lens frame 220. In other words, the lock mechanism has the unlock state in which the movable lens frame 220 is not restricted from moving in the direction perpendicular to the optical axis. As the lock ring 500 rotates from the unlock position to the lock position illustrated in FIG. 6, the lock lever 510 pops out in the movable range direction of the movable lens frame 220 and contacts the movable lens frame 220. The movable lens frame 220 moves in an eccentricity direction as indicated by an arrow in FIG. 6 and is retained at a position while decentered from the optical axis center by a fixed side mechanical end 211 and the two lock levers 510 at the inner diameter of the fixed lens frame 210 so that the movable range is restricted. In other words, the lock mechanism has the lock state in which the movable lens frame 220 is restricted from moving in the direction perpendicular to the optical axis. In order to restrict the movement of the movable lens frame 220 while the movable lens frame 220 is eccentric, this embodiment provides two lever members, rather than the three conventional lever member, and makes smaller the image stabilization unit 202.

Figure 10:
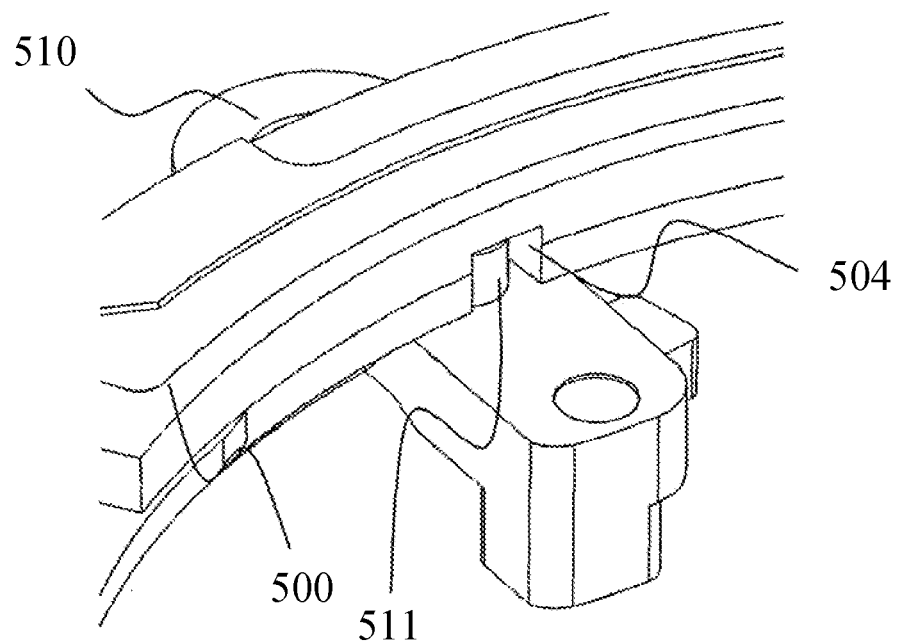
FIG. 10 is an explanatory view of an engagement between the lock ring and the lock lever.

In this embodiment, as illustrated in FIGS. 8 and 9, the engaging portion 504 has a protrusion (convex) shape, and the engaging portion 511 has a groove shape extending in the direction perpendicular to the optical axis. Instead, as illustrated in FIG. 10, the engaging portion 504 may have a groove shape, and the engaging portion 511 may have a protrusion shape. In other words, one of the lock ring 500 and the lock lever 510 may have a projecting shape (engaging portion) and the other may have a groove shape (engaged portion). An appropriate shape for the engaging portion may be selected based on the function, component strength, and mold requirements.

Figure 11:
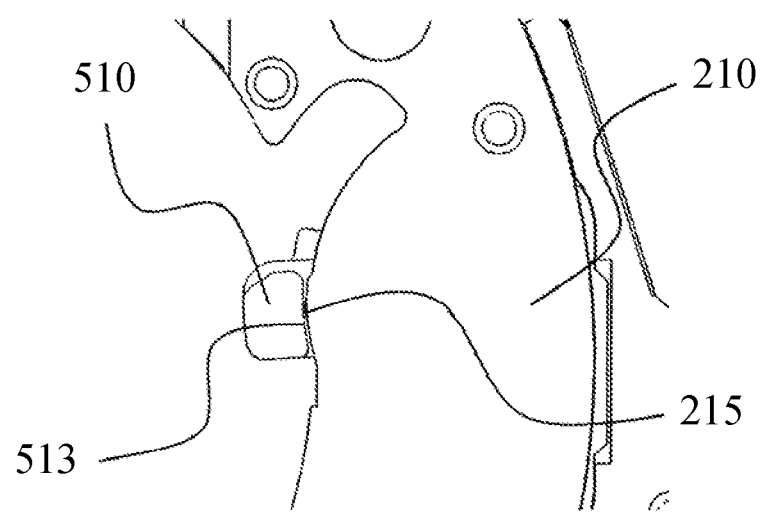
FIG. 11 is an enlarged view of an imaging plane side of a fixed lens frame and the lock lever.
Figure 12:
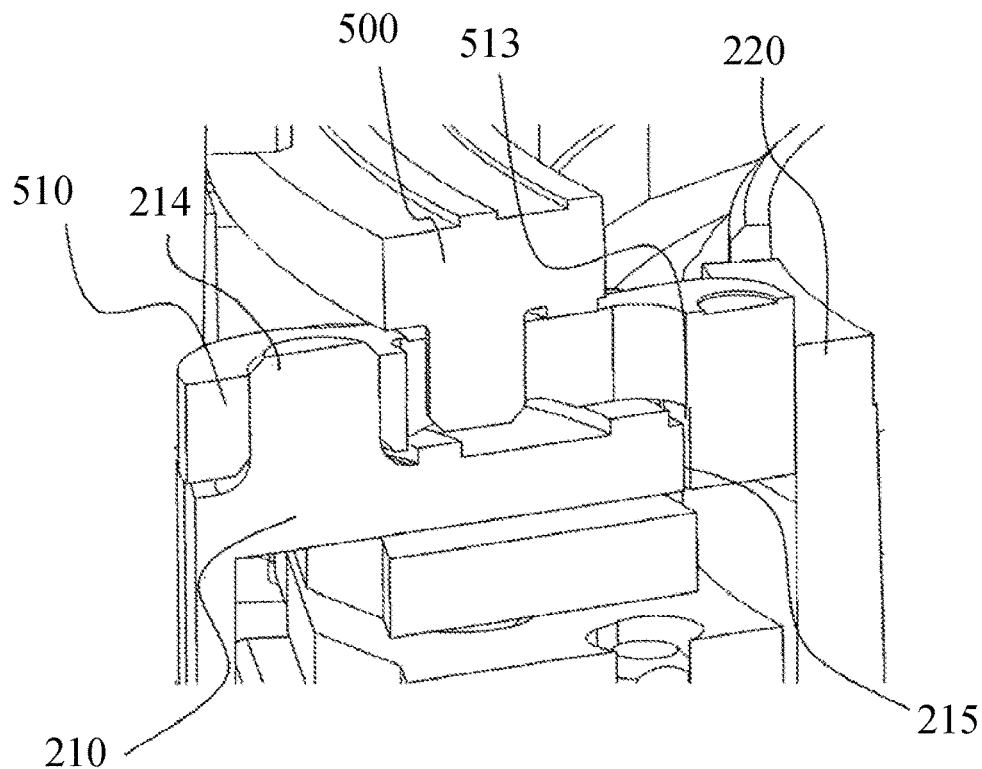
FIG. 12 is a sectional view of the fixed lens frame and the lock lever.

FIG. 11 is an enlarged view of the fixed lens frame 210 and the lock lever 510 on the imaging plane side. FIG. 12 is a sectional view of the fixed lens frame 210 and the lock lever 510. The lock lever 510 has a lock lever side facing surface (contact portion, first contact portion) 513, and the fixed lens frame 210 has a fixed side facing surface 215. When the lock lever 510 is located at the lock position, the lock lever side facing surface 513 and the fixed side facing surface 215 are close to each other so that they can contact each other. When the movable lens frame 220 receives an impact and the lock lever 510 receives this impact, this configuration enables the fixed lens frame 210 to receive the deformed lock lever 510. Hence, the lock lever 510, the engagement shaft 214, and the like can be prevented from breaking. In comparison with a configuration that does not have the above structure, even when the lock lever 510 and the engagement shaft 214 are thin, they are hard to break, the image stabilization unit 202 can be made smaller, and the layout freedom degree improves. The lock lever 510 may be made of an elastically deformable resin.

Figure 13:
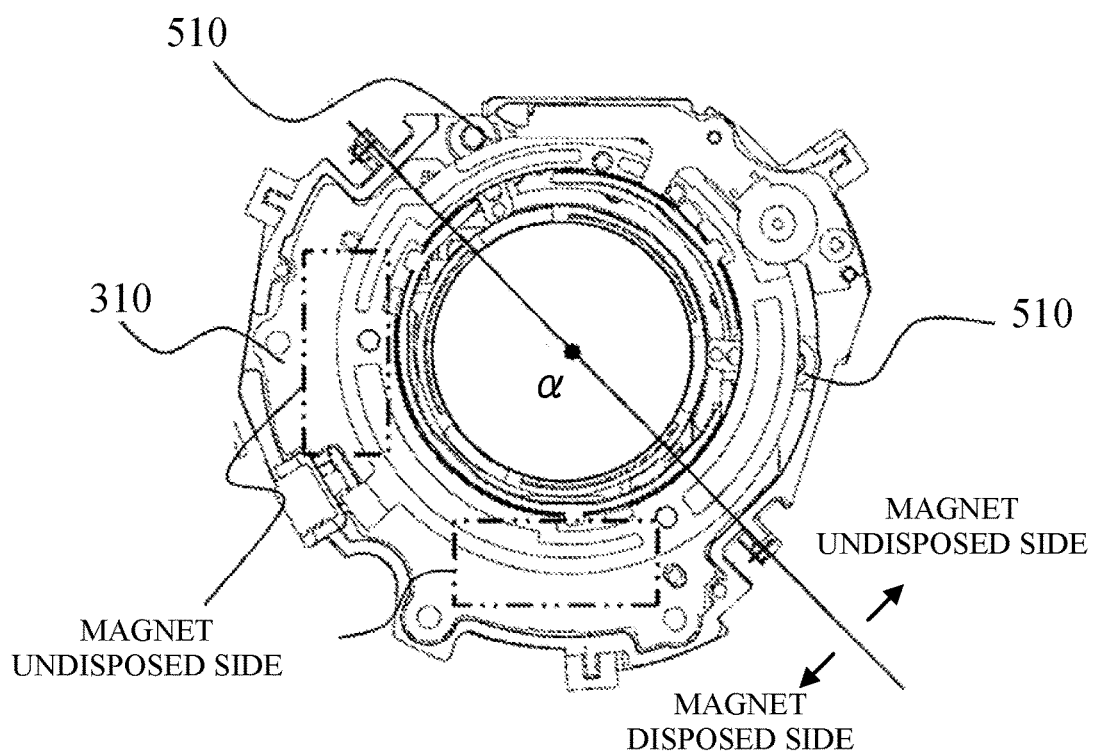
FIG. 13 is an explanatory view of an arrangement phase of the lock lever.

FIG. 13 is an explanatory view of the arrangement phase of the lock lever 510. A straight line A in FIG. 13 passes the optical axis α and divides the outer circumference of the movable lens frame 220 into two areas. The lock lever 510 is located one of areas divided by the straight line A which is a side (magnet undisposed side) opposite to a side (magnet disposed side) on which the driver is disposed which includes the shift coil 330 and the shift magnet 340 and moves the movable lens frame 220. Since a yoke member (first yoke 310 in this embodiment) is disposed on the magnet disposed side, it is difficult to provide the fixed lens frame 210 with the engagement shaft 214. If the engagement shaft 214 is provided on the yoke, the image stabilization unit 202 would be enlarged in the optical axis direction. This embodiment has the above configuration, and thus makes smaller the image stabilization unit 202.

This embodiment disposes, as illustrated in FIG. 7, the lock lever 510 between the fixed lens frame 210 and the lock ring 500 in the optical axis direction. Disposing the lock lever 510 in this manner maximizes the space created by the thickness of the first yoke 310. This embodiment caps the lock lever 510 with the lock ring 500, and the lock ring 500 can serve to prevent the lock lever 510 from coming off. This configuration contributes to a reduced number of components and a smaller size of the image stabilization unit 202.

In this embodiment, the lock ring 500 has the lock ring side mechanical ends 503a and 503b, and the lock motor 520 has the fixed side mechanical end 522. When the lock mechanism is in the unlock state, the fixed mechanical end 522 contacts the lock ring mechanical end 503a. When the lock mechanism is in the lock state, the fixed mechanical end 522 contacts the lock ring mechanical end 503b. This configuration can prevent the lock ring 500 from rotating more than necessary. When an impact or the like is applied to the image stabilization unit 202, the influence of the lock ring 500 and the lock lever 510 on other components such as the fixed lens frame 210 can be suppressed, and the malfunction or the like can be prevented.

In the image stabilization unit 202 of this embodiment, when the movement of the movable lens frame 220 is restricted by the lock mechanism, the movable lens frame 220 is retained not at the optical axis center but at a position eccentric to the optical axis α. This means that the movable lens frame 220 is decentered when the lens barrel 201 is powered off. Thus, the image stabilization unit 202 according to this embodiment is suitable, for example, for a camera system (such as a nonreflex single-lens camera) that does not have an optical viewfinder.

Second Embodiment

Figure 14:
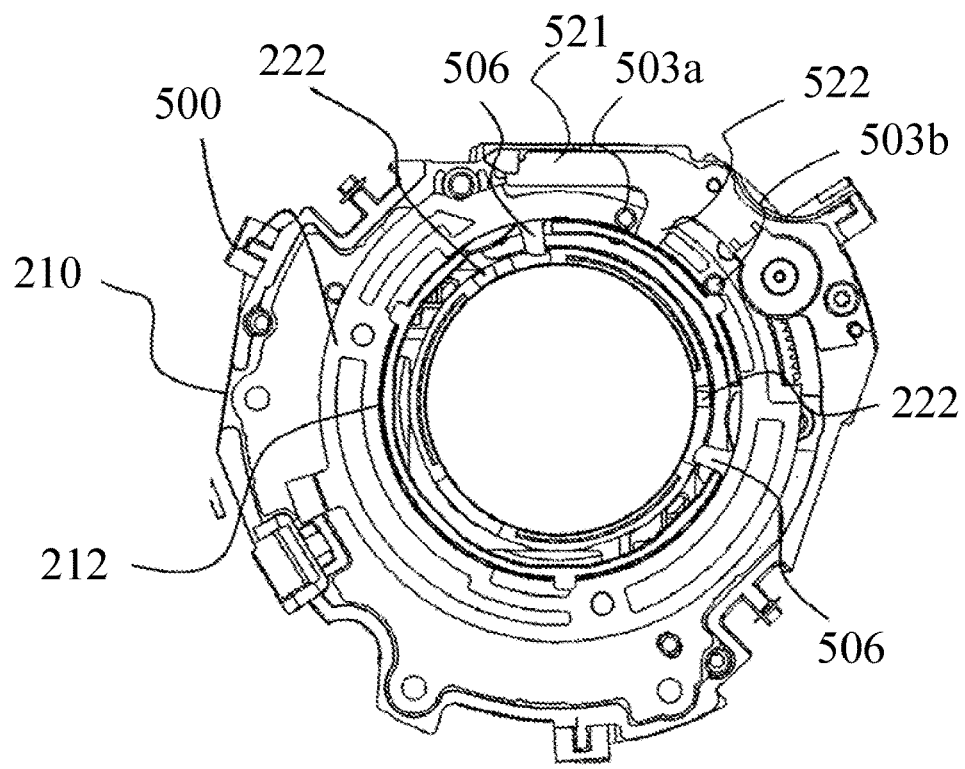
FIG. 14 illustrates the lock mechanism in the unlock state according to a second embodiment.
Figure 15:
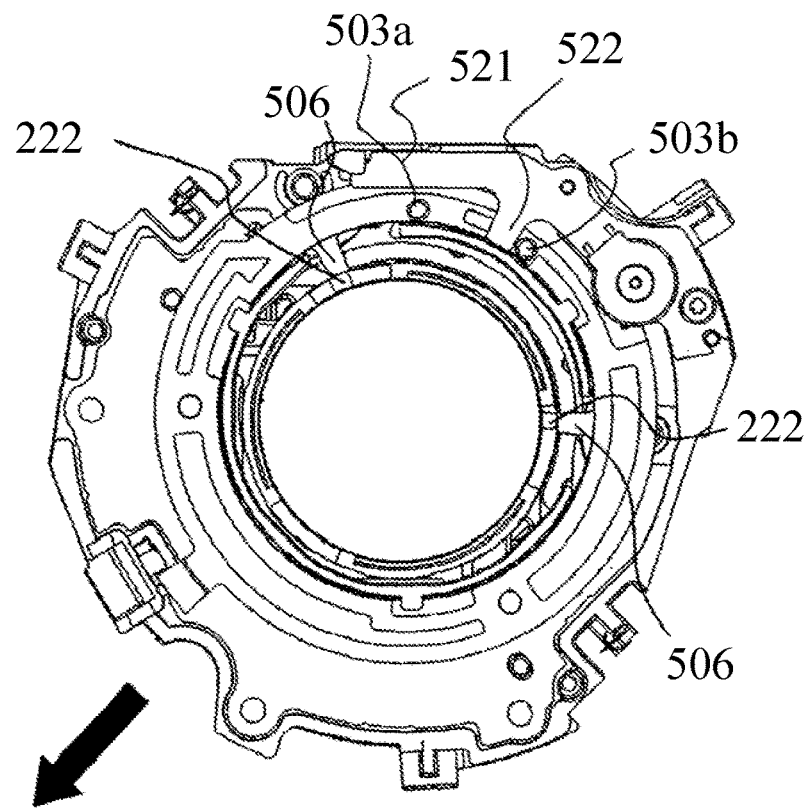
FIG. 15 illustrates the lock mechanism in the lock state according to the second embodiment.
Figure 16:
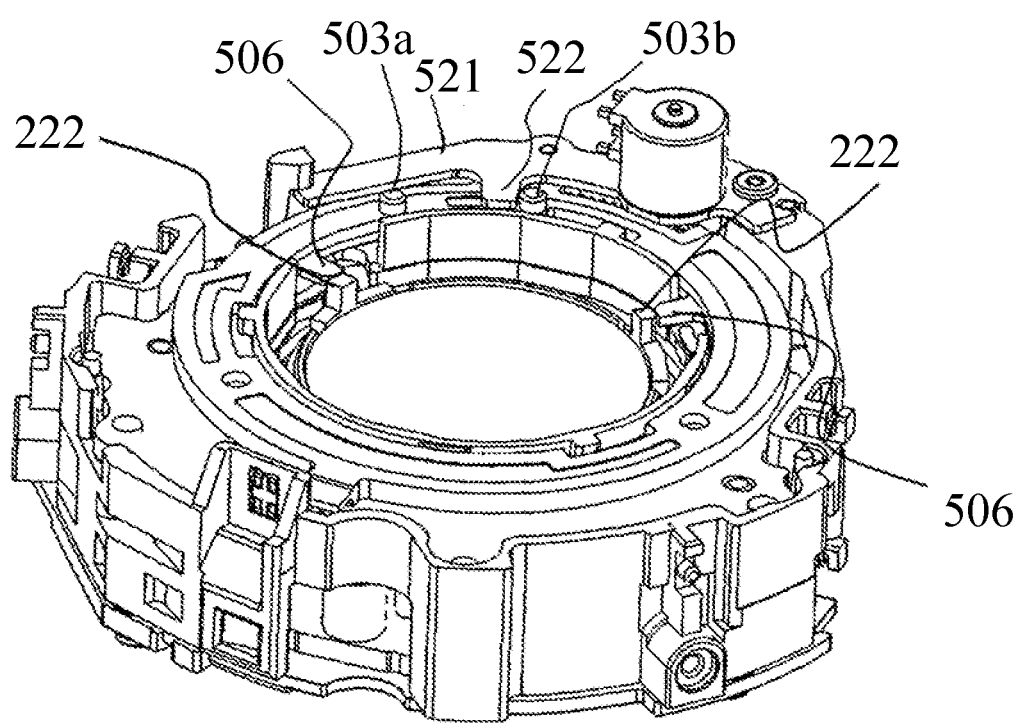
FIG. 16 is a perspective view showing the structure of the lock mechanism according to the second embodiment.

This embodiment will describe the lock ring 500 serving as the lock lever 510. FIG. 14 illustrates the lock mechanism in the unlock state in which the movable lens frame 220 is not restricted from moving in the direction perpendicular to the optical axis. FIG. 15 illustrates the lock mechanism in the lock state in which the movable lens frame 220 is restricted from moving in the direction perpendicular to the optical axis. FIG. 16 is a perspective view of the structure of the lock mechanism. This embodiment will describe a structure different from that of the first embodiment.

The movable lens frame 220 has a lock receiver 222, and the lock ring 500 has a contact portion (retaining member) 506. When the lock mechanism is in the unlock state, the lock receiver 222 does not contact the contact portion 506 and the movable range of the movable lens frame 220 is unrestricted. On the other hand, when the lock mechanism is in the lock state, the lock receiving portion 222 and the contact portion 506 contact each other and the movable range of the movable lens frame 220 is restricted. At this time, as in the first embodiment, the movable lens frame 220 is offset within the movable range. With such a configuration, the number of restricting members can be reduced to two, rather than conventional three, and the image stabilization unit 202 can be made smaller.

Third Embodiment

Referring now to FIGS. 17 to 22, a description will be given of an image stabilization unit according to a third embodiment. Similar to the image stabilization units according to the first and second embodiments described above, the lock state and the unlock state are switched as a certain member rotates but the rotating member is different in the image stabilization unit according to this embodiment. The difference between the image stabilization units according to the first and second embodiments described above and the image stabilization unit according to this embodiment will be mainly described below.

Figure 17:
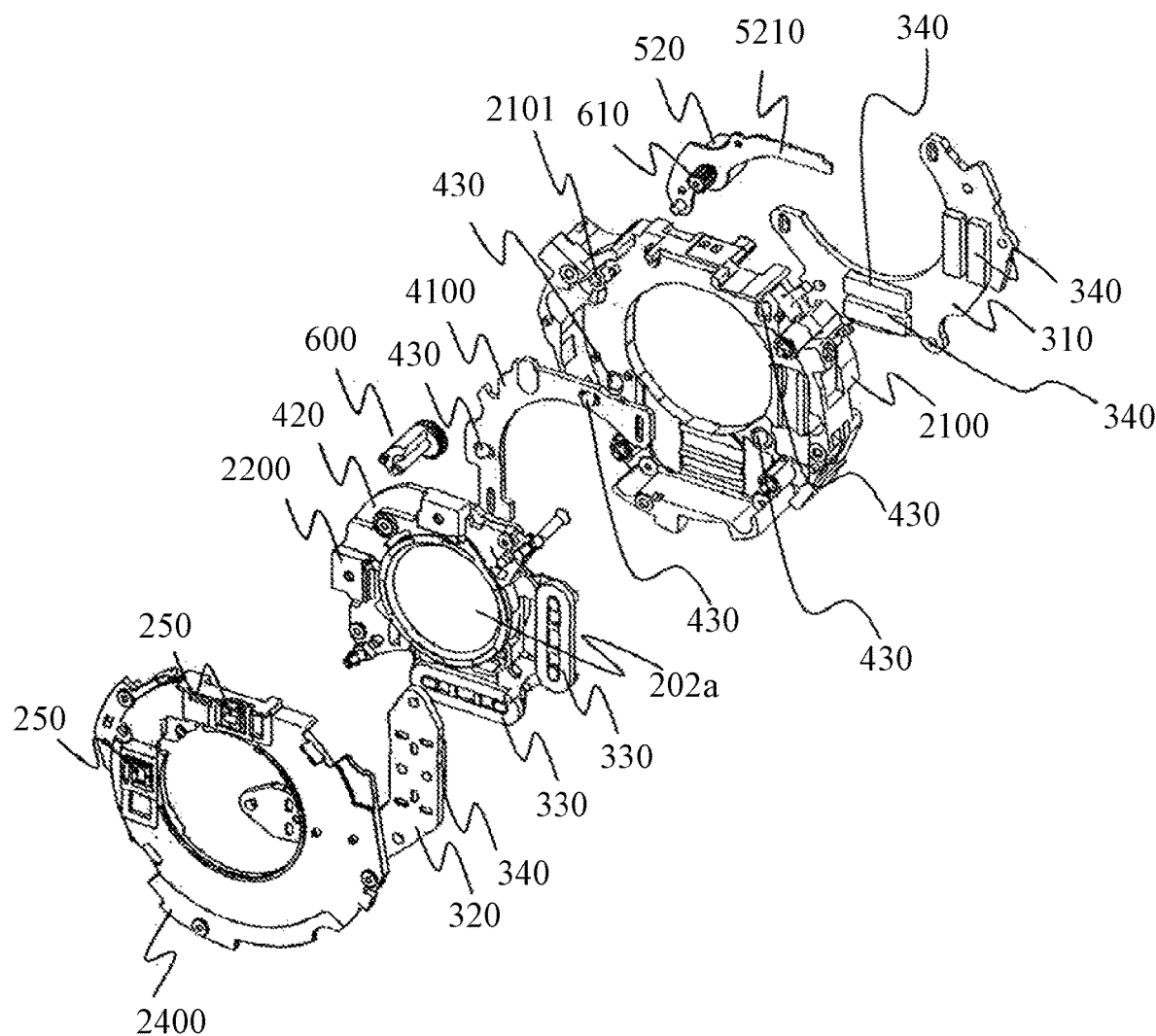
FIG. 17 is an exploded perspective view of an image stabilization unit viewed from the imaging surface side according to a third embodiment.
Figure 18:
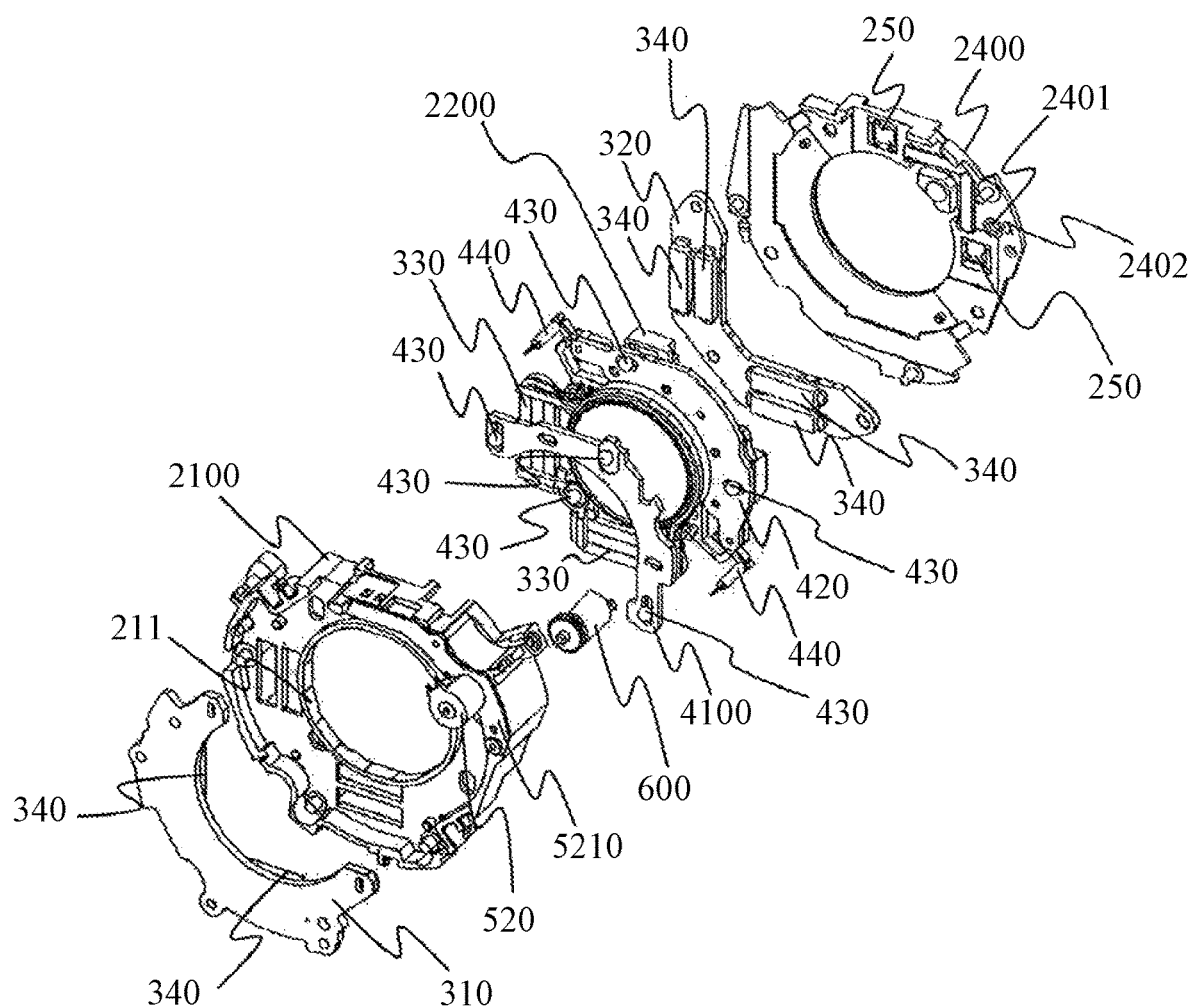
FIG. 18 is an exploded perspective view of the image stabilization unit viewed from the object side according to the third embodiment.

FIG. 17 is an exploded perspective view of the image stabilization unit according to this embodiment viewed from the imaging surface side, and FIG. 18 is an exploded perspective view of the image stabilization unit according to this embodiment viewed from the object side.

The main difference between the image stabilization unit according to the first embodiment illustrated in FIGS. 2 and 3 and the image stabilization unit according to this embodiment illustrated in FIGS. 17 and 18 is a rotation lock cylindrical member 600 provided instead of the lock ring 500 as a lock member and a semi-cylindrical portion 603 provided to the rotation lock cylindrical member 600 instead of the lock lever 510. In other words, the lock member and the retaining member may be integrated with each other. Moreover, the shapes of the movable lens frame, the fixed lens frame, the first anti-roll plate, the sensor holding frame, the motor sheet metal, and the like are different. In FIGS. 17 and 18, reference numeral 2200 denotes the movable lens frame, reference numeral 2100 denotes the fixed lens frame, reference numeral 4100 denotes the first anti-roll plate, reference numeral 2400 denotes the sensor holding frame, and reference numeral 5210 denotes the motor sheet metal.

Figure 19B:
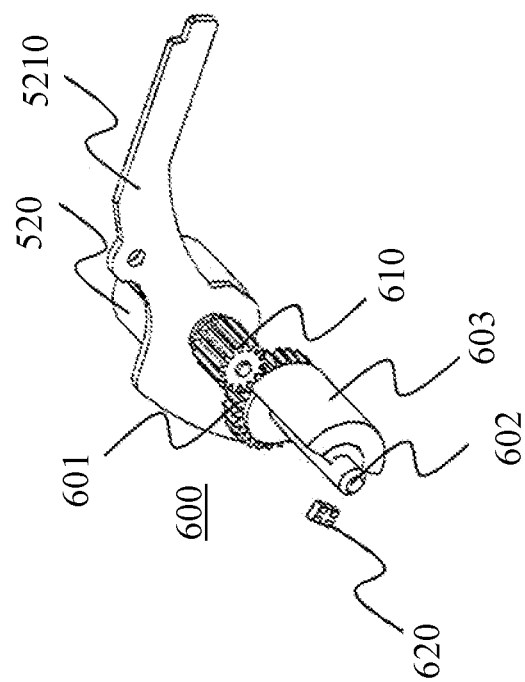
FIGS. 19A and 19B are perspective views showing a structure of a rotation lock cylindrical member.
Figure 19A:
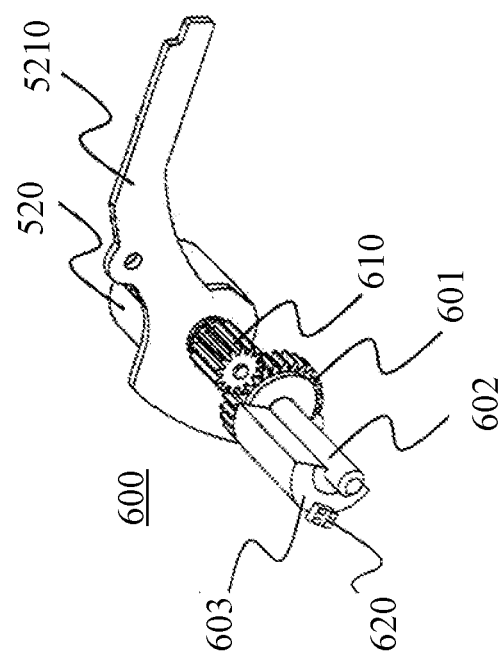

FIGS. 19A and 19B illustrate the configuration of the rotation lock cylindrical member 600. FIG. 19A illustrates the rotation lock cylindrical member 600 in the unlock state, and FIG. 19B illustrates the rotation lock cylindrical member 600 in the lock state. As illustrated in FIGS. 19A and 19B, the rotation lock cylindrical member 600 includes a gear 601, a rotation shaft portion 602, and a semi-cylindrical portion 603.

Reference numeral 620 denotes a photo reflector that detects whether the rotation lock cylindrical member 600 is in the unlock state or in the lock state. The photo reflector 620 includes a light emitter and a light receiver. As illustrated in FIG. 19A, in the unlock state, the photo reflector 620 and the semi-cylindrical portion 603 overlap each other, and the light from the light emitter in the photo reflector 620 is reflected by an end surface in the axial direction of the semi-cylindrical portion 603 and enters the light receiver. On the other hand, as illustrated in FIG. 19B, in the lock state, the photo reflector 620 and the semi-cylindrical portion 603 do not overlap each other, and the light from the light emitter of the photo reflector 620 does not enter the light receiver. Whether it is in the unlock state or in the lock state can be determined based on whether the light from the light emitter described above enters the light receiver.

Since the gear 601, the rotating shaft portion 602, and the semi-cylindrical portion 603 are integrated with each other, as the gear 610 is rotated by the lock motor 520, the gear 601, the rotating shaft portion 602, and the semi-cylindrical portion 603 integrally rotate. This configuration can switch between the unlock state and the lock state of the rotation lock cylindrical member 600. The photo reflector 620 is held by the sensor holding frame 2400 while engaged with a hole 2402 illustrated in FIG. 18.

FIG. 20A illustrates the image stabilization unit in the unlock state, and FIG. 20B illustrates the image stabilization unit in the lock state. As illustrated in FIG. 20B, even this embodiment retains the image stabilization lens 202a while it is decentered from the optical axes of other lenses in the lock state, similar to the first and second embodiments. In the lock state, the movable lens frame 2200 contacts the fixed side mechanical end 211.

Figure 21:
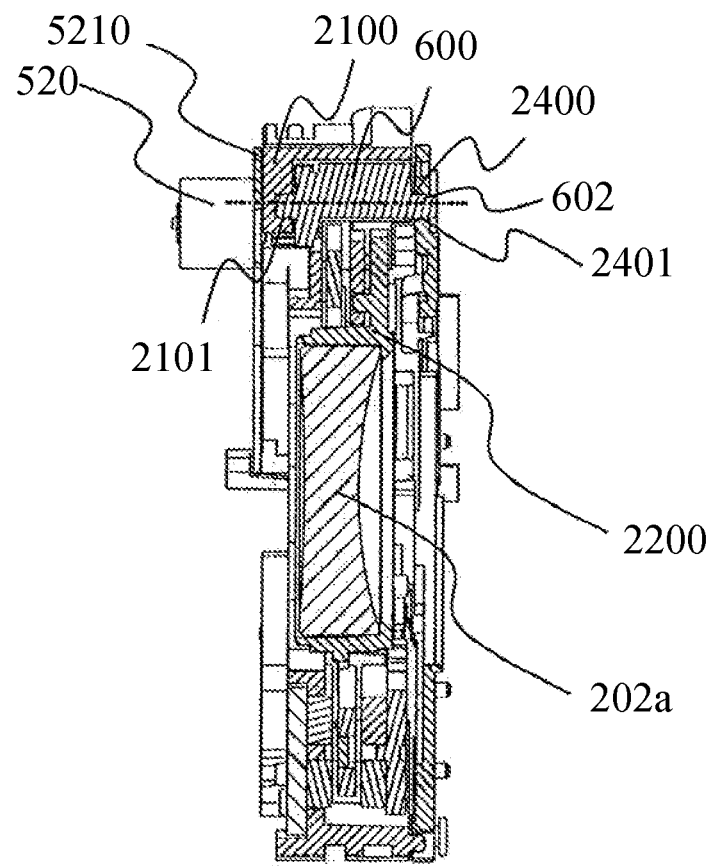
FIG. 21 is a sectional view of the image stabilization unit in the unlock state.

FIG. 21 is a sectional view of the image stabilization unit taken along a line indicated by an alternate long and short dash line in FIG. 20A. As illustrated in FIG. 21, the rotation shaft portion 602 is pivotally supported by a hole portion 2401 provided in the sensor holding frame 2400 and a hole provided 2101 in the fixed lens frame 2100.

Figure 22B:
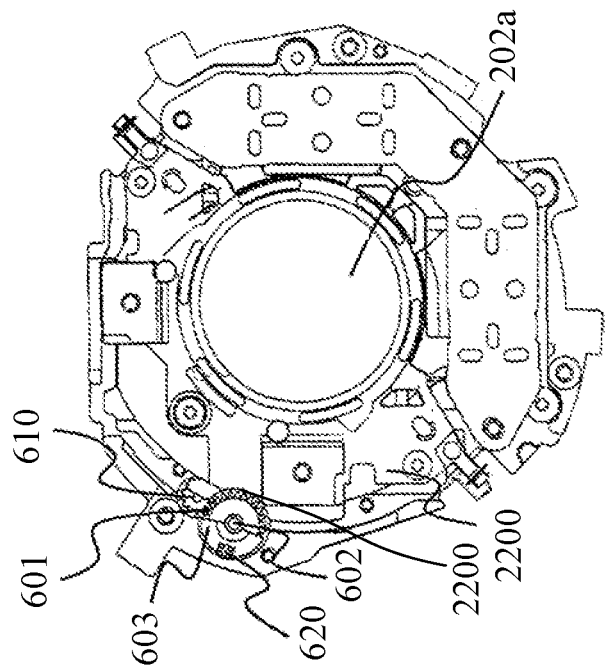
FIGS. 22A to 22D illustrate the image stabilization unit in each process from the unlock state to the lock state.
Figure 22A:
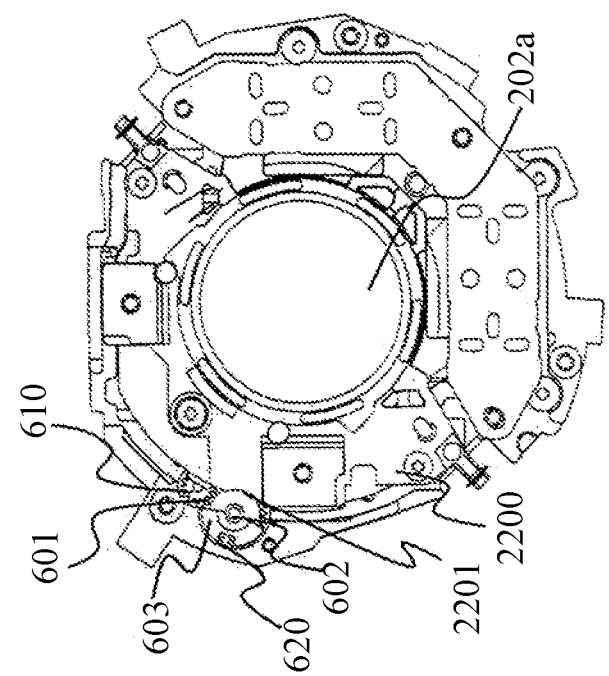
Figure 22D:
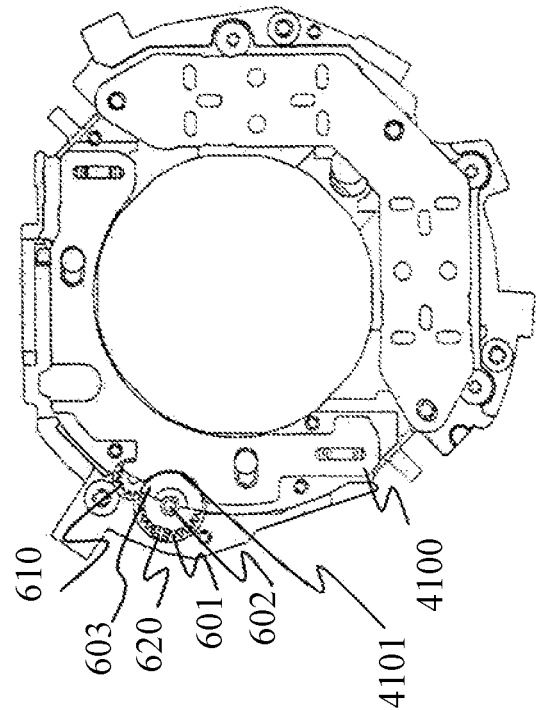
Figure 22C:
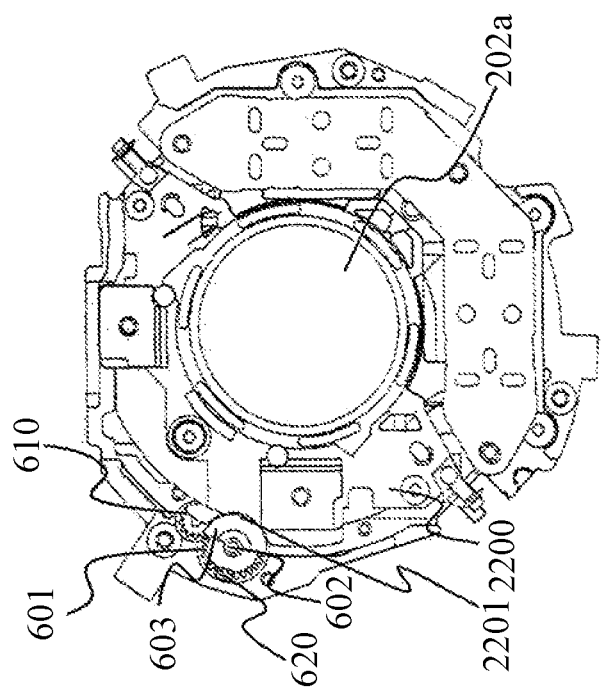

Referring now to FIGS. 22A to 22D, a description will be given of the states of the image stabilization unit according to this embodiment in each process from the unlock state to the lock state. FIG. 22A illustrates the image stabilization unit in the unlock state. FIGS. 22A, 22B, and 22C omit the sensor holding frame 2400 and the like for description convenience, and FIG. 22D further omits the movable lens frame 2200 and the second anti-roll plate 420 for description purposes. As illustrated in FIG. 22A, the semi-cylindrical portion 603 does not face the movable lens frame 2200, or does not contact a concave portion 2201 provided in the movable lens frame 2200.

In transferring from the unlock state to the lock state, the driving controller 204 instructs the image stabilization unit to move the movable lens frame 2200 from the state illustrated in FIG. 22A to the state illustrated in FIG. 22B. FIG. 22B illustrates a state in which the movable lens frame 2200 is moved in the right direction on the paper plane from the state illustrated in FIG. 22A and the movable lens frame 2200 contacts the right mechanical end on the paper plane. Since the gear 601 in FIG. 22B exposes further than that in FIG. 22A, it can be understood that the movable lens frame 2200 has moved in the right direction on the paper plane. In moving the movable lens frame 2200 in the right direction on the paper plane, the same method may be used as that of moving the movable lens frame 2200 in the normal image stabilization.

When the movable lens frame 2200 is in the state illustrated in FIG. 22B, the lock motor 520 rotates the gear 610. As a result, the semi-cylindrical portion 603 rotates from the position illustrated in FIGS. 22A and 22B to the position illustrated in FIG. 22C. When the power is not supplied to the image stabilization unit in the state illustrated in FIG. 22C, the movable lens frame 2200 attempts to return to the state illustrated in FIG. 22A due to the coil spring 440 or the state where the image stabilization lens 202a is not decentered. Then, the up/down and left/right movements of the movable lens frame 2200 are limited when the semi-cylindrical portion 603 contacts the concave 2201, and thus the state illustrated in FIG. 22C or the state in which the image stabilization lens 202a is decentered is maintained, even if the power is not supplied to the image stabilization unit, and the lock is completed.

FIG. 22D is a view in which the movable lens frame 2200 and the second anti-roll plate 420 are removed from FIG. 22C. As illustrated in FIG. 22D, the first anti-roll plate 4100 has a concave portion 4101 similar to the concave portion 2201 provided in the movable lens frame 2200 as described above. As illustrated in FIGS. 22C and 22D, the concave portions 2201 and 4101 have the same shape as that of the semi-cylindrical portion 603, and the semi-cylindrical portion 603 contacts the concave portions 2201 and 4101 in the lock state. Thereby, the movable lens frame 2200 is restricted from moving in the longitudinal direction on the paper plane. Further, in the lock state, the movable lens frame 2200 contacts the rotation lock cylindrical member 600 and the fixed side mechanical end 211, so that it is restricted from moving in the lateral direction on the paper plane.

As described above, this embodiment does not need the lock ring 500 as compared with the first embodiment described above, provides the rotation lock cylindrical member 600 in the thickness range of the image stabilization unit, and thus can make the image stabilization unit thinner in the optical axis direction. The movable lens frame locking mechanism can be realized with fewer components than that in the first embodiment that requires both the lock ring 500 and the lock lever 510. Advantageously, the rotary shaft portion 602 as a thin shaft portion provides a small load torque in rotating the rotary shaft portion 602 with few rattles, the lock motor 520 can stably rotate with few operational noises. The lock motor 520 includes a stepping motor, but may have a configuration other than the stepping motor as long as it can rotate the rotation lock cylindrical member 600.

In the lock state, the rotation lock cylindrical member 600 may contact the movable lens frame 2200 or a member fixed to the movable lens frame 2200 instead of the movable lens frame 2200 (second anti-roll plate 420). In the lock state, the rotation lock cylindrical member 600 may contact both the movable lens frame 2200 and the second anti-roll plate 420.

Fourth Embodiment

Referring now to FIGS. 23 to 28D, a description will be given of an image stabilization unit according to a fourth embodiment. In the image stabilization units according to each of the embodiments described above, the unlock state and the lock state are switched as the certain member rotates. On the other hand, the image stabilization unit according to this embodiment moves a certain member in the optical axis direction to switch between the unlock state and the lock state. The difference between the image stabilization unit according to the first embodiment and the image stabilization unit according to this embodiment will be mainly discussed below.

Figure 23:
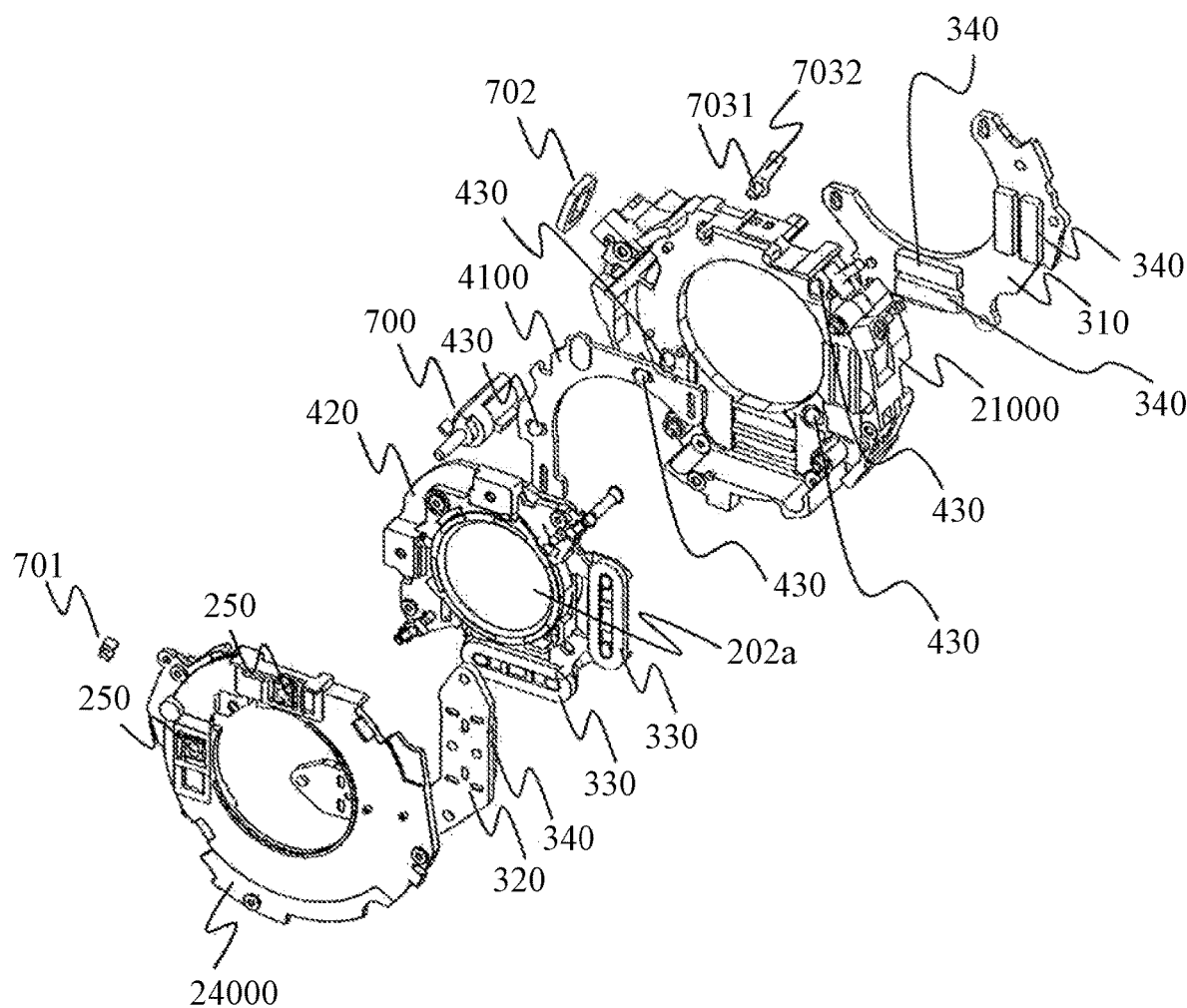
FIG. 23 is an exploded perspective view of the image stabilization unit viewed from the imaging surface side according to a fourth embodiment.
Figure 24:
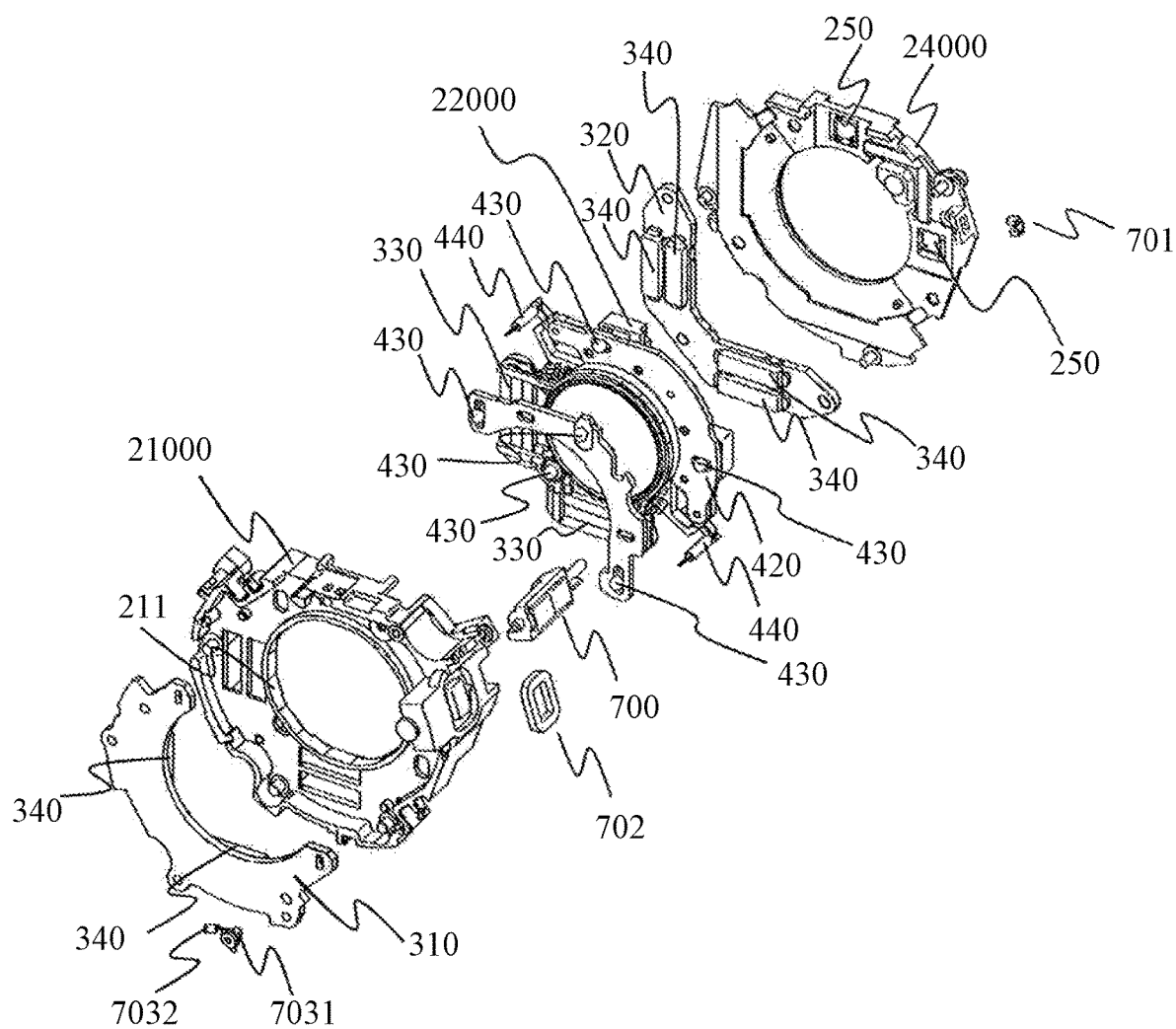
FIG. 24 is an exploded perspective view of the image stabilization unit viewed from the object side according to the fourth embodiment.

FIG. 23 is an exploded perspective view of the image stabilization unit according to this embodiment viewed from the imaging surface side, and FIG. 24 is an exploded perspective view of the image stabilization unit according to this embodiment viewed from the object side. The major difference between the image stabilization unit according to the first embodiment illustrated in FIGS. 2 and 3 and the image stabilization unit according to this embodiment illustrated in FIGS. 23 and 24 is that a movable lock cylindrical member 700 is provided instead of the lock ring 500 as the lock member and the movable lock cylindrical member 700 has a semi-cylindrical portion 707 instead of the lock lever 510. In other words, the lock member and the retaining member may be integrated with each other. Moreover, the shapes of the movable lens frame, the fixed lens frame, the first anti-roll plate, the sensor holding frame, and the like are different. In FIGS. 23 and 24, reference numeral 22000 denotes the movable lens frame, reference numeral 21000 denotes the fixed lens frame, reference numeral 4100 denotes first anti-roll plate, and reference numeral 24000 denotes the sensor holding frame.

Figure 25A:
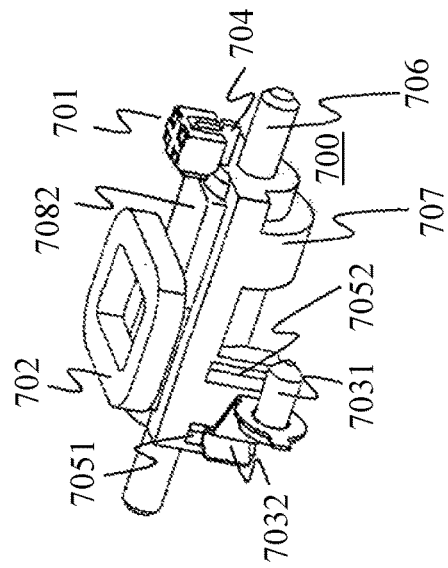
FIGS. 25A to 25D illustrate a structure of a movable lock cylindrical member.
Figure 25B:
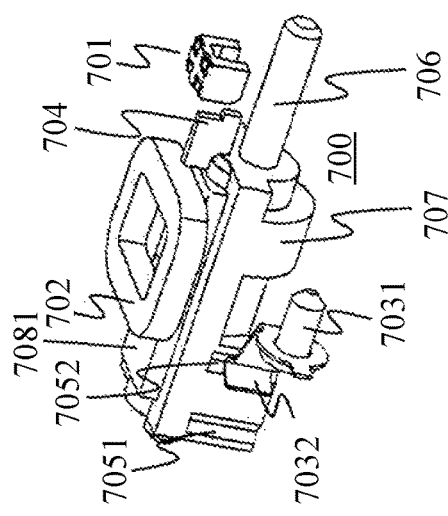
Figure 25C:
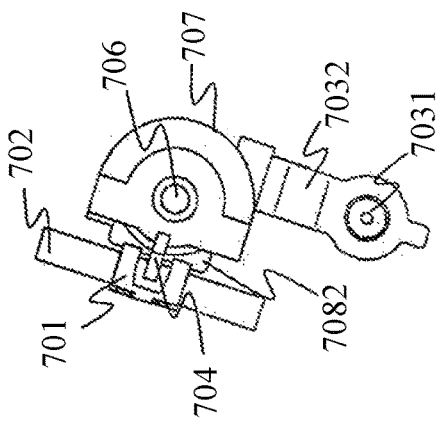
Figure 25D:
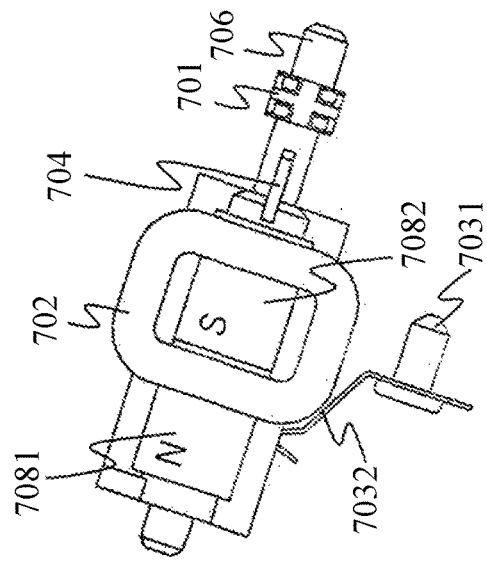

FIGS. 25A to 25D illustrate the structure of the movable lock cylindrical member 700 described above. FIG. 25A illustrates the movable lock cylindrical member 700 in the unlock state, and FIG. 25B illustrates the movable lock cylindrical member 700 in the lock state. FIG. 25C illustrates the movable lock cylindrical member 700 viewed from a direction orthogonal to the axial direction of a support shaft 706 described later, and FIG. 25D illustrates the movable lock cylindrical member 700 viewed from the axial direction of the support shaft 706.

Figure 27A:
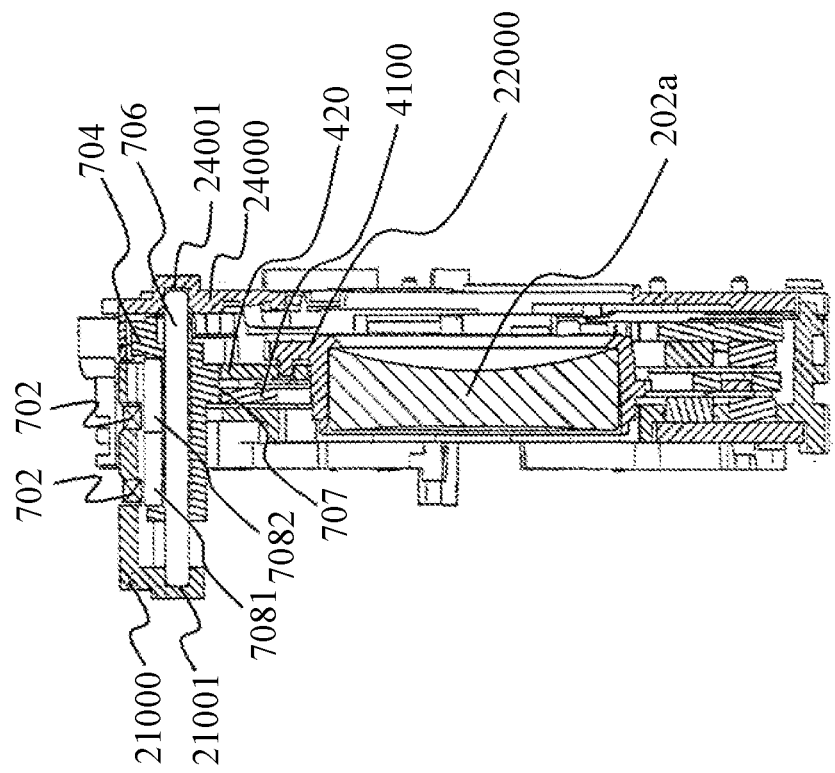
FIGS. 27A and 27B are sectional views of the image stabilization unit in the unlock state and in the lock state.
Figure 27B:
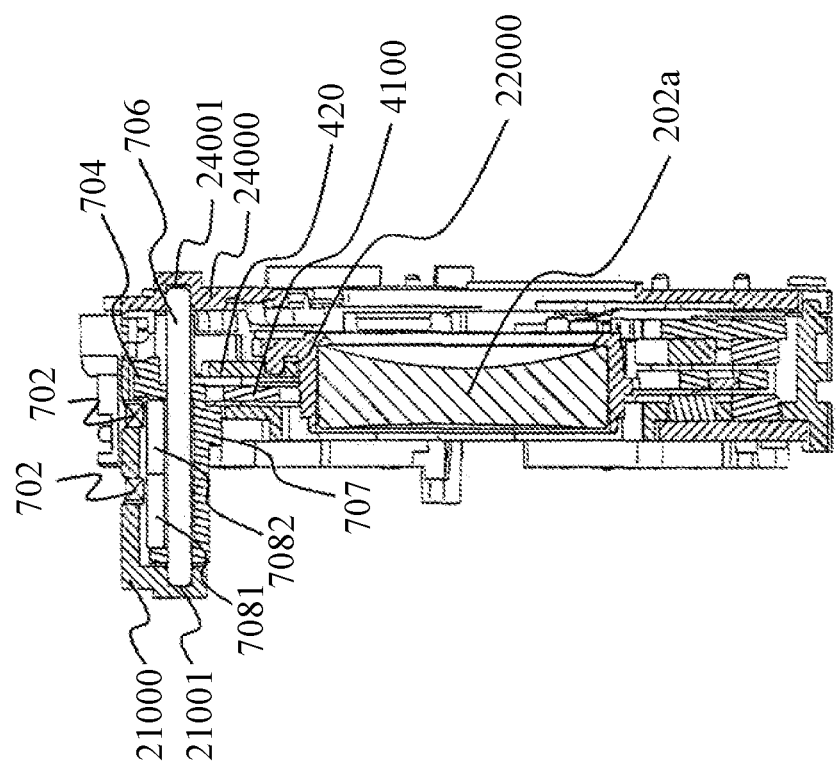

As illustrated in FIGS. 25A and 25B, the movable lock cylindrical member 700 includes a light shield portion 704, a semi-cylindrical portion 707, a first click groove 7051, and a second click groove 7052. The movable lock cylindrical member 700 is supported by the support shaft 706. As illustrated in FIGS. 27A and 27B, which will be described later, both ends of the support shaft 706 are engaged with a concave portion 21001 provided in the fixed lens frame 21000 and a concave portion 24001 provided in the sensor holding frame 24000.

The moving lock cylindrical member 700 includes a first magnet portion 7081 (N pole) and a second magnet portion 7082 (S pole). A coil 702 is provided above the first magnet unit 7081 and the second magnet unit 7082. The coil 702 is held by a fixed lens frame 21000 as illustrated in FIGS. 27A and 27B described later. The first magnet unit 7081, the second magnet unit 7082, and the coil 702 constitute a driving unit that moves the movable lock cylindrical member 700 in the axial direction of the support shaft 706.

In the unlock state, a click leaf spring 7032 is engaged with in the second click groove 7052, and in the lock state, the click leaf spring 7032 is engaged with in the first click groove 7051. When the click flat spring 7032 is engaged with the first click groove 7051 or the second click groove 7052, the axial position of the support shaft 706 of the movable lock cylindrical member 700 is fixed when the driver is not driven. The click leaf spring 7032 is fixed onto the fixed lens frame 21000 by a screw 7031.

Reference numeral 701 denotes a photo-interrupter. The photo-interrupter 701 has a light emitter and a light receiver. In the lock state illustrated in FIG. 25B, the light shielding unit 704 prevents the light from the light emitter from entering the light receiver. On the other hand, in the unlock state illustrated in FIG. 25A, the light shielding unit 704 does not shield the light from the light emitter, and thus the light from the light emitter enters the light receiver. Whether it is in the unlock state or in the lock state can be determined based on whether the light from the light emitter described above enters the light receiver.

Figure 26A:
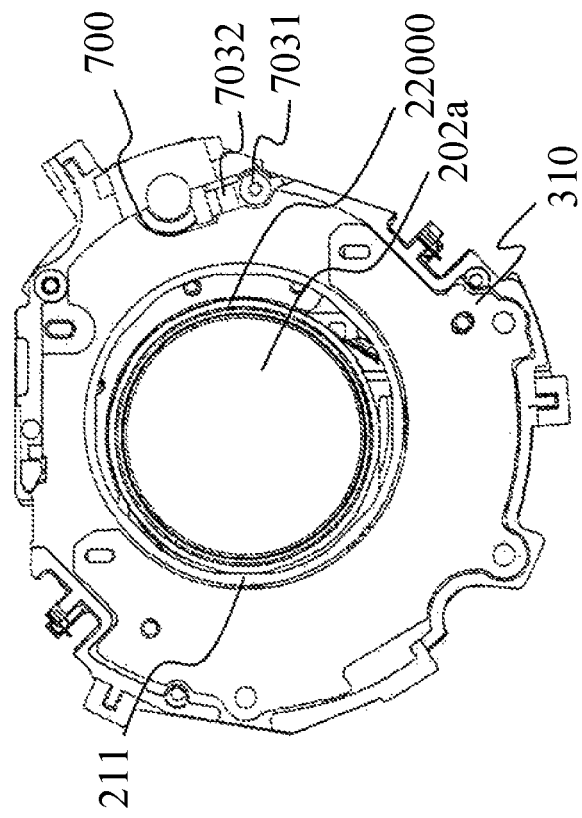
FIGS. 26A and 26B illustrate the image stabilization unit in the unlock state and in the lock state.
Figure 26B:
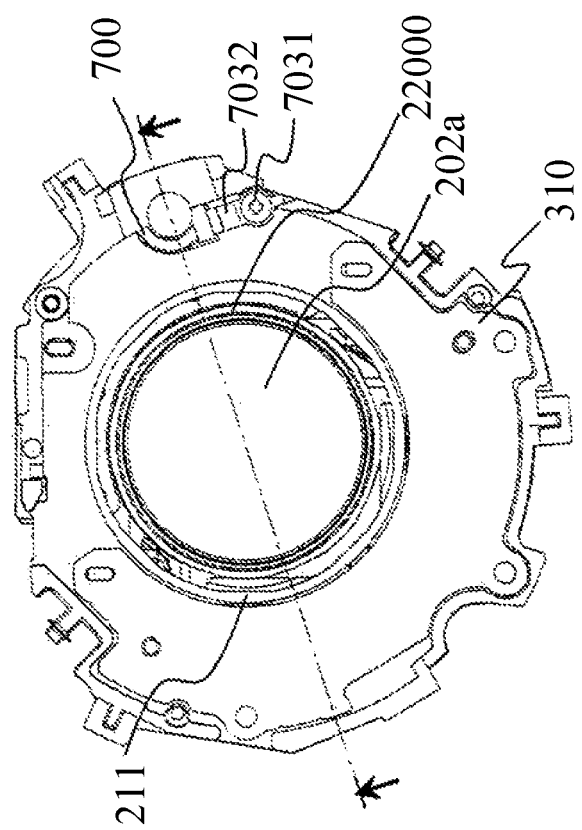

FIG. 26A illustrates the image stabilization unit in the unlock state, and FIG. 26B illustrates the image stabilization unit in the lock state. As illustrated in FIG. 26B, even this embodiment retains the image stabilization lens 202a while it is decentered from the optical axes of the other lenses in the lock state, similar to the first and second embodiments described above. In the lock state, the movable lens frame 22000 contacts the fixed side mechanical end 211.

FIGS. 27A and 27B are sectional views of the image stabilization unit taken along a line indicated by an alternate long and short dash line in FIG. 26A. FIG. 27A is a sectional view of the image stabilization unit in the unlock state, and FIG. 27B is a sectional view of the image stabilization unit in the lock state.

As illustrated in FIG. 27A, in the unlock state, the movable lock cylindrical member 700 is separated from the movable lens frame 22000, the first anti-roll plate 4100, and the second anti-roll plate 420 in the optical axis direction of the image stabilization lens 202a. In other words, in the unlock state, the semi-cylindrical portion 707 (or the movable lock cylindrical member 700) is located at a position where it does not overlap at least one of the movable lens frame 22000, the first anti-roll plate 4100, and the second anti-roll plate 420 when viewed from the direction orthogonal to the optical axis.

As illustrated in FIG. 27B, in the lock state, the movable lock cylindrical member 700 is close to the movable lens frame 22000, the first anti-roll plate 4100, and the second anti-roll plate 420 in the optical axis direction of the image stabilization lens 202a. In other words, in the lock state, the semi-cylindrical portion 707 (or the movable lock cylindrical member 700) is located at a position where it overlaps at least one of the movable lens frame 22000, the first anti-roll plate 4100, and the second anti-roll plate 420 when viewed form the direction orthogonal to the optical axis.

Figure 28A:
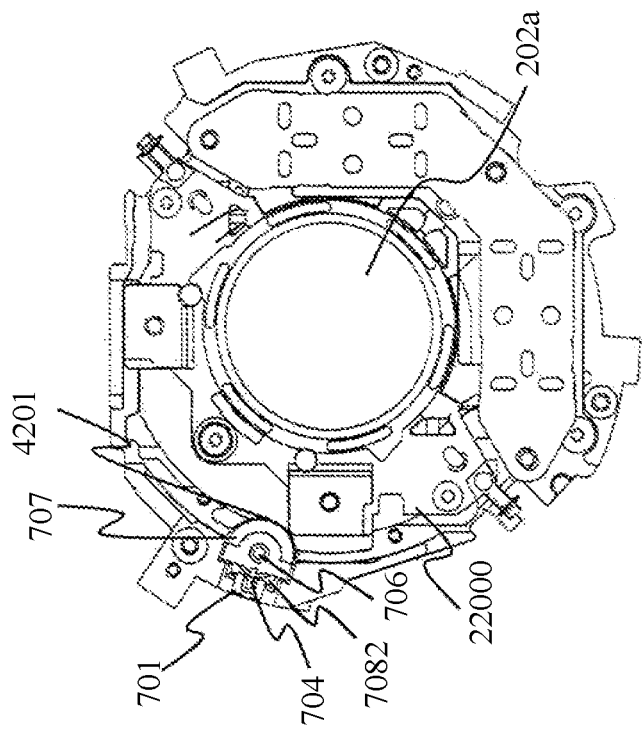
FIGS. 28A to 28D illustrate an image stabilization unit in each process from the unlock state to the lock state.
Figure 28B:
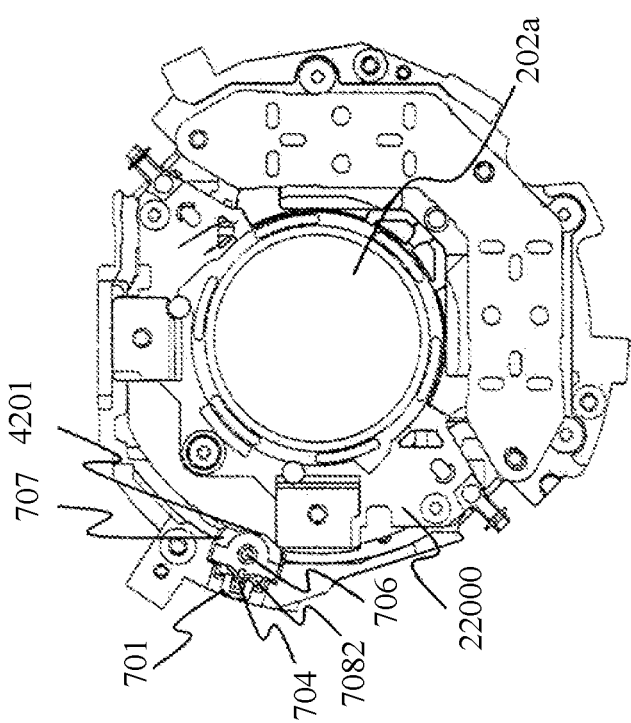
Figure 28D:
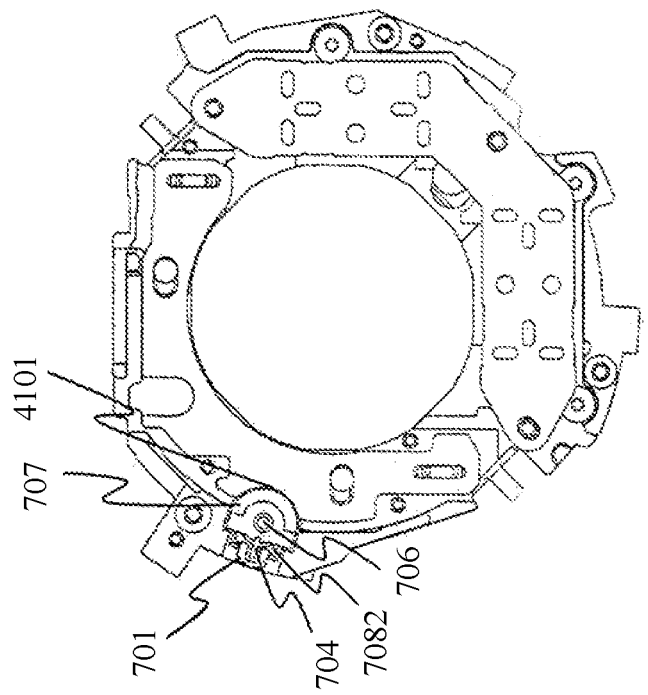
Figure 28C:
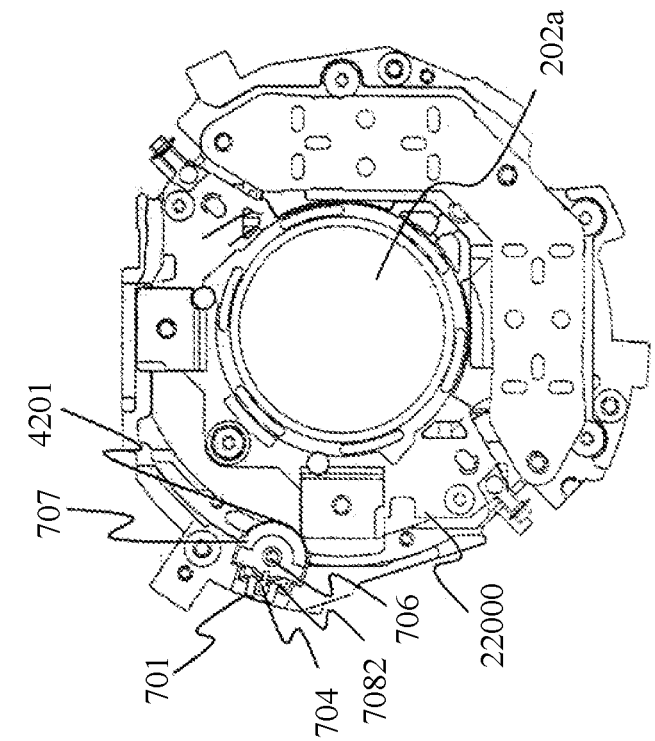

Referring now to FIGS. 28A to 28D, a description will be given of the states of the image stabilization unit according to this embodiment in each process from the unlock state to the lock state. FIG. 28A illustrates the image stabilization unit in the unlock state. FIGS. 28A, 28B, and 28C omit the sensor holding frame 24000 and the like for convenience of explanation, and in FIG. 28D omits the movable lens frame 22000 and the second anti-roll plate 420 for description purposes.

In transferring from the unlock state to the lock state, the driving controller 204 instructs the image stabilization unit to move the movable lens frame 22000 from the state illustrated in FIG. 28A to the state illustrated in FIG. 28B. FIG. 28B illustrates a state in which the movable lens frame 22000 is moved in the right direction on the paper plane from the state illustrated in FIG. 28A and the movable lens frame 22000 contacts the right mechanical end on the paper plane. Since the semi-cylindrical portion 707 in FIG. 28B exposes further than that in FIG. 28A, it can be understood that the movable lens frame 22000 has moved to the right direction on the paper plane. In moving the movable lens frame 22000 in the right direction on the paper plane, the same method may be used as that of moving the movable lens frame 22000 in the normal image stabilization.

When the movable lens frame 22000 is in the state illustrated in FIG. 28B, the driving controller 204 instructs the driver including the first magnet unit 7081, the second magnet unit 7082, and the coil 702 described above to move the movement lock cylindrical member 700 to move in the axial direction of the support shaft 706. As a result, the driver moves the movable lock cylindrical member 700 from the position illustrated in FIG. 27A to the position illustrated in FIG. 27B. When the power is not supplied to the image stabilization unit in the state illustrated in FIG. 28C, the movable lens frame 22000 attempts to return to the state illustrated in FIG. 28A due to the coil spring 440 or the state where the image stabilization lens 202a is not decentered. Then, the semi-cylindrical portion 707 contacts the concave portion 4201 in the second anti-roll plate 420, and thus the state illustrated in FIG. 28C or the state in which the image stabilization lens 202a is decentered is maintained, and the lock is completed.

FIG. 28D is a view in which the movable lens frame 22000 and the second anti-roll plate 420 are removed from FIG. 28C. As illustrated in FIG. 28D, the first anti-roll plate 4100 has a concave portion 4101 similar to the concave portion 4201 provided in the second anti-roll plate 420 described above. As illustrated in FIGS. 28C and 28D, the concave portions 4201 and 4101 have the same shape as that of the semi-cylindrical portion 707, and the semi-cylindrical portion 707 contacts the concave portions 4201 and 4101 in the lock state. Thus, the movable lens frame 2200 is restricted from moving in the longitudinal direction on the paper plane. Further, in the lock state, the movable lens frame 2200 contacts the fixed side mechanical end 211, so that it is restricted from moving in the lateral direction on the paper plane.

As described above, this embodiment does not need the lock ring 500 as compared with the first embodiment, provides the movable lock cylindrical member 700 in the thickness range of the image stabilization unit, and thus can make the image stabilization unit thinner in the optical axis direction. This embodiment switches between the unlock state and the lock state by slightly moving the movable lock cylindrical member 700, so that the unlock state and the lock state can be switched quickly.

This embodiment moves the movable lock cylindrical member 700 using a voice coil motor, but may use a combination of a stepping motor with a lead screw and a rack other than the VCM as long as it can move the movable lock cylindrical member 700 in the axial direction of the support shaft 706.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-84728, filed on Apr. 26, 2018 which is hereby incorporated by reference herein in its entirety.

What is claimed is:

1. An image stabilization apparatus comprising:
a fixed member;
a movable member configured to hold an image stabilization lens and movable relative to the fixed member on a plane perpendicular to an optical axis of the image stabilization lens;
a lock member that is disposed on an outer circumference side of the movable member and can be positioned at a lock position for restricting a movement of the movable member and an unlock position for enabling the movement of the movable member; and
a retaining member configured to fix the movable member in an eccentric state when the lock member is located at the lock position.

2. The image stabilization apparatus according to claim 1, wherein when the lock member is located at the unlock position, the retaining member does not fix the movable member.

3. The image stabilization apparatus according to claim 1, wherein the retaining member includes a lever member having a rotation axis on an outer circumference of the movable member, and
wherein one of the retaining member and the lock member includes an engaging portion, and the other of the retaining member and the locking member includes an engaged portion engaged with the engaging portion.

4. The image stabilization apparatus according to claim 3, wherein the engaging portion has a convex portion, and the engaged portion has a groove.

5. The image stabilization apparatus according to claim 4, wherein the engaged portion is a groove extending in a direction perpendicular to the optical axis.

6. The image stabilization apparatus according to claim 1, wherein a plurality of retaining members are arranged at different phases on an outer circumference of the movable member.

7. The image stabilization apparatus according to claim 1, wherein the retaining member includes a contact portion configured to contact part of the fixed member when the lock member is located at the lock position.

8. The image stabilization apparatus according to claim 1, wherein the retaining member is made of an elastically deformable resin.

9. The image stabilization apparatus according to claim 1, further comprising a driver including a magnet configured to drive the movable member relative to the fixed member,
wherein when the outer circumference of the movable member is divided into two areas by a straight line passing the optical axis, the retaining member is disposed in an area opposite to an area where the magnet is disposed.

10. The image stabilization apparatus according to claim 1, wherein the retaining member is disposed between the fixed member and the lock member in an optical axis direction.

11. The image stabilization apparatus according to claim 1, wherein the lock member includes a restricting portion configured to restrict a rotation range of the lock member.

12. The image stabilization apparatus according to claim 11, further comprising:
a second driver configured to rotate the lock member; and
a second retaining member configured to hold the second driver,
wherein the second retaining member includes a contact portion configured to contact the restricting portion when the lock member is located at each of the lock position and the unlock position.

13. The image stabilization apparatus according to claim 1, wherein the lock member is rotatable between the lock position and the unlock position.

14. The image stabilization apparatus according to claim 1, wherein the lock member and the retaining member are integrated with each other.

15. The image stabilization apparatus according to claim 14, wherein the lock member and the retaining member are rotatable between the lock position and the unlock position.

16. The image stabilization apparatus according to claim 14, wherein the lock member and the retaining member are movable between the lock position and the unlock position in an optical axis direction of the image stabilization lens.

17. A lens apparatus comprising:
an image stabilization apparatus that includes a fixed member, a movable member configured to hold an image stabilization lens and movable relative to the fixed member on a plane perpendicular to an optical axis of the image stabilization lens, a lock member that is disposed on an outer circumference side of the movable member and can be positioned at a lock position for restricting a movement of the movable member and an unlock position for enabling the movement of the movable member, and a retaining member configured to fix the movable member in an eccentric state when the lock member is located at the lock position; and
a movable lens movable along the optical axis.

18. A camera system comprising:
a lens apparatus; and
an imaging apparatus including an image sensor configured to photoelectrically convert an object image formed via the lens apparatus,
wherein the lens apparatus includes:
an image stabilization apparatus that includes a fixed member, a movable member configured to hold an image stabilization lens and movable relative to the fixed member on a plane perpendicular to an optical axis of the image stabilization lens, a lock member that is disposed on an outer circumference side of the movable member and can be positioned at a lock position for restricting a movement of the movable member and an unlock position for enabling the movement of the movable member, and a retaining member configured to fix the movable member in an eccentric state when the lock member is located at the lock position; and a movable lens movable along the optical axis.

* * * * *